(12) United States Patent
Moradian et al.

(10) Patent No.: US 12,518,069 B2
(45) Date of Patent: Jan. 6, 2026

(54) COMPREHENSIVE MODELING PLATFORM FOR MANUFACTURING EQUIPMENT

(71) Applicant: Applied Materials, Inc., Santa Clara, CA (US)

(72) Inventors: Ala Moradian, San Jose, CA (US); Umesh Kelkar, Cupertino, CA (US); Prashanth Kothnur, San Jose, CA (US); Karthik Ramanathan, Bangalore (IN); Preetham Rao, Morgan Hill, CA (US); Mudit Pasagadagula, Saratoga, CA (US); Anup Kumar D. Doddamane, Davangere (IN)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 18/826,639

(22) Filed: Sep. 6, 2024

(65) Prior Publication Data

US 2025/0086342 A1    Mar. 13, 2025

(30) Foreign Application Priority Data

Sep. 8, 2023 (IN) .............................. 202341060419

(51) Int. Cl.
*G06F 30/17* (2020.01)

(52) U.S. Cl.
CPC .................... *G06F 30/17* (2020.01)

(58) Field of Classification Search
CPC ................................ G06F 30/00; G06F 30/17
(Continued)

(56) References Cited

U.S. PATENT DOCUMENTS

| D436,580 | S | 1/2001 | Navano et al. |
| D631,891 | S | 2/2011 | Vance et al. |

(Continued)

FOREIGN PATENT DOCUMENTS

| JP | D1714555 | 5/2022 |
| JP | 1722129 S | 8/2022 |

(Continued)

OTHER PUBLICATIONS

International Search Report and Written Opinion for International Application No. PCT/US2024/045845, mailed Dec. 20, 2024, 9 Pages.

*Primary Examiner* — Cedric Johnson
(74) *Attorney, Agent, or Firm* — Lowenstein Sandler LLP

(57) ABSTRACT

A method includes receiving, via a graphical user interface (GUI), by a processing device, a first user input to view data associated with a first process chamber in a first chamber data mode. Data of the first chamber data mode includes data of a process operation performed in the first process chamber. The method further includes providing, for display on the GUI, first display data of the first data chamber mode responsive to receiving the first user input. The method further includes receiving a second user input to view data associated with the first process chamber in a second chamber data mode. Data of the second chamber data mode includes data of a virtual process operation performed by a virtual representation of the first process chamber. The method further includes providing, for display on the GUI, second display data of the second data chamber mode.

17 Claims, 9 Drawing Sheets

(58) Field of Classification Search
USPC .......................................................... 703/7, 6
See application file for complete search history.

(56) References Cited

U.S. PATENT DOCUMENTS

| | | |
|---|---|---|
| D824,944 S | 8/2018 | Sagrillo et al. |
| D987,675 S | 5/2023 | Fujisaki et al. |
| 2018/0365370 A1 | 12/2018 | Egan et al. |
| 2022/0284342 A1 | 9/2022 | Cantwell |
| 2023/0222264 A1 | 7/2023 | Mahakali et al. |

FOREIGN PATENT DOCUMENTS

| | | | |
|---|---|---|---|
| JP | 1745953 S | 6/2023 | |
| KR | 20220013382 A | 2/2022 | |
| KR | D3011593420000 | 4/2022 | |
| TW | D176416 S | 6/2016 | |
| TW | D208187 S | 11/2020 | |
| TW | D220447 S | 8/2022 | |
| TW | D224196 S | 3/2023 | |
| TW | D225143 S | 5/2023 | |
| TW | D225297 S | 5/2023 | |
| TW | D226224 S | 7/2023 | |
| WO | WO-2022155635 A1 * | 7/2022 | ............. G06F 30/17 |
| WO | WO-2022221178 A1 * | 10/2022 | ......... G05B 19/0425 |

* cited by examiner

COMPREHENSIVE MODELING PLATFORM
FOR MANUFACTURING EQUIPMENT

RELATED APPLICATION

This application claims the benefit of Indian Provisional Patent Application No. 202341060419, filed Sep. 8, 2023, entitled "COMPREHENSIVE MODELING PLATFORM FOR MANUFACTURING EQUIPMENT," which is incorporated by reference herein.

TECHNICAL FIELD

The present disclosure relates to methods associated with models used for assessment of manufactured devices, such as semiconductor devices. More particularly, the present disclosure relates to a comprehensive modeling platform for manufacturing equipment.

BACKGROUND

Products may be produced by performing one or more manufacturing processes using manufacturing equipment. For example, semiconductor manufacturing equipment may be used to produce substrates via semiconductor manufacturing processes. Products are to be produced with particular properties, suited for a target application. Various models such as digital twin models are used in various process control and predictive functions associated with manufacturing equipment. Models associated with manufacturing equipment are trained and/or calibrated using data associated with the manufacturing equipment.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular embodiments of the disclosure or any scope of the claims. Its sole purpose is to present some concepts of the disclosure in a simplified form as a prelude to the more detailed description that is presented later.

In one aspect of the present disclosure, a method includes receiving, via a graphical user interface (GUI), by a processing device, a first user input to view data associated with a first process chamber in a first chamber data mode. Data of the first chamber data mode includes data of a process operation performed in the first process chamber. The method further includes providing, for display on the GUI, first display data of the first data chamber mode responsive to receiving the first user input. The method further includes receiving a second user input to view data associated with the first process chamber in a second chamber data mode. Data of the second chamber data mode includes data of a virtual process operation performed by a virtual representation of the first process chamber. The method further includes providing, for display on the GUI, second display data of the second data chamber mode responsive to receiving the second user input.

In another aspect of the present disclosure, a method includes outputting, by a processing device, a view of a manufacturing system. The manufacturing system includes a number of process chambers. The manufacturing system further includes one or more transfer chambers. The manufacturing system further includes one or more load locks. The view includes, for each process chamber of the manufacturing system, a graphical representation of the process chamber. The view further includes one or more view options for data associated with the process chambers of the manufacturing system. The method further includes receiving an input of a view option for a process chamber from the one or more view options of the plurality of process chambers. The method further includes loading one or more virtual models associated with the selected process chamber and the selected view option. Each process chamber is associated with one or more virtual models configured for that process chamber.

In another aspect of the present disclosure, a method includes receiving, via a GUI of a modeling platform, a first user input of a first process chamber. The method further includes, responsive to receiving the first user input of the first process chamber, providing, to a first model, first input data. The first input data includes sensor data from the first process chamber. The method further includes obtaining, from the first model, first output data. The first output data includes predictive data associated with the sensor data from the first process chamber. The method further includes, responsive to receiving the first user input of the first process chamber, providing, to a second model, second input data. The second input data includes simulation inputs of a virtual substrate processing operation. The method further includes obtaining, from the second model, second output data. The second output data includes predictive data of the virtual substrate processing operation. The method further includes providing the first output data and the second output data for display on the GUI of the modeling platform.

BRIEF DESCRIPTION OF THE DRAWINGS

The present disclosure is illustrated by way of example, and not by way of limitation in the figures of the accompanying drawings.

DETAILED DESCRIPTION

Figure 1:
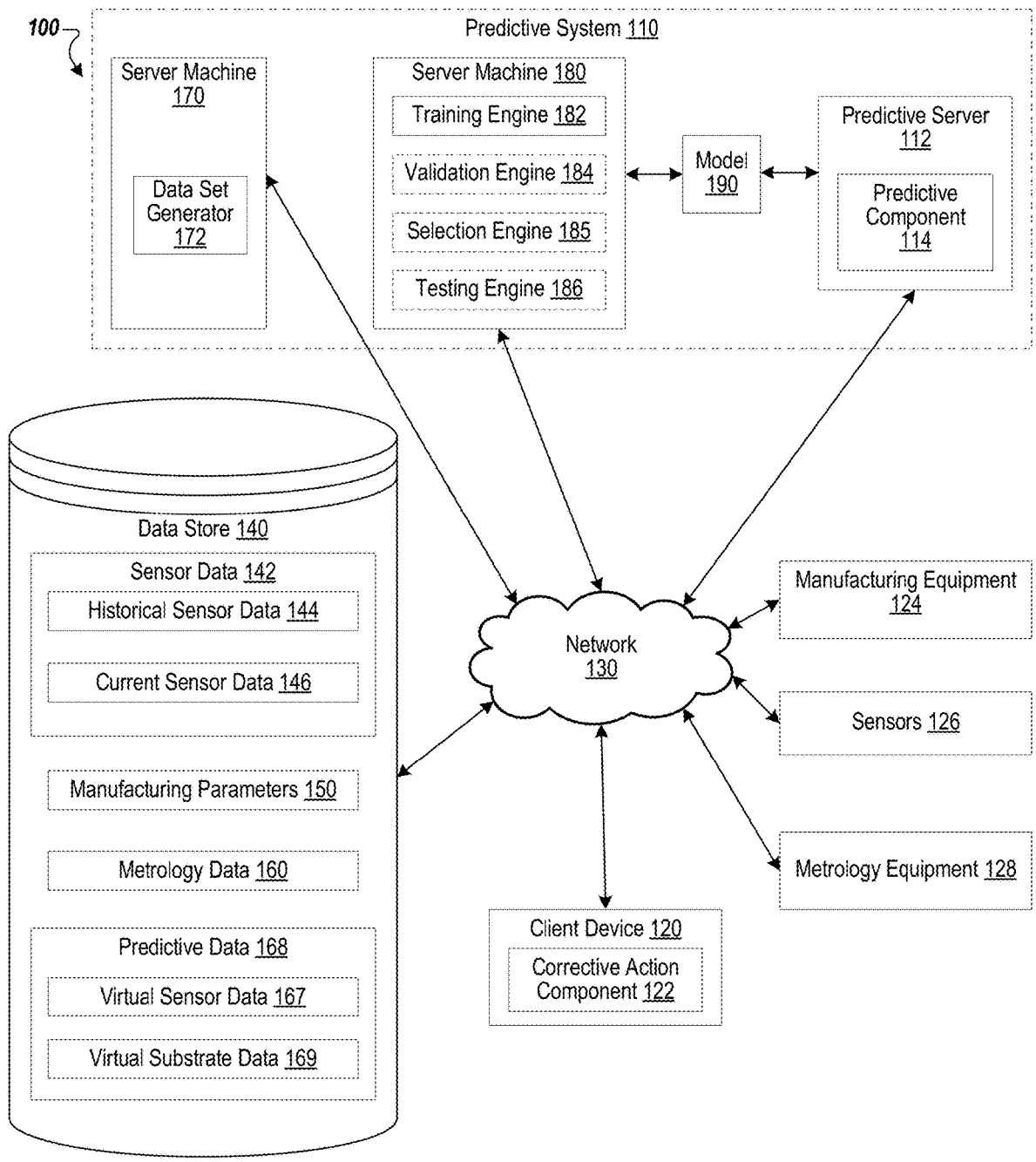
FIG. 1 is a block diagram illustrating an exemplary system architecture, according to some embodiments.

Described herein are technologies related to a platform for presenting information indicative of process chamber performance to improve manufacturing of substrates. Manufacturing equipment is used to produce products, such as substrates (e.g., wafers, semiconductors). Manufacturing equipment may include a manufacturing or processing chamber to separate the substrate from the environment. The properties of produced substrates are to meet target values to facilitate specific functionalities. Manufacturing parameters are selected to produce substrates that meet the target property values. Many manufacturing parameters (e.g., hardware parameters, process parameters, etc.) contribute to the properties of processed substrates. Manufacturing systems may control parameters by specifying a set point for a property value and receiving data from sensors disposed within the manufacturing chamber, and making adjustments to the manufacturing equipment until the sensor readings match the set point. Data generated by physical process chambers (e.g., sensor data, virtual sensor data, virtual metrology data, etc.) and data generated by corresponding virtual process chambers may be utilized in generating input/output mappings, in designing new process recipes, in updating current process recipes, and the like. Physics-based models, statistical models, and trained machine learning models may be utilized to improve performance of manufacturing equipment.

Models are utilized to provide an understanding of processing operations. A quality of performance of a process operation may be understood based on output of one or more models. Quality of performance may refer to the degree to which a process operation meets design goals, such as threshold property conditions of a processed substrate, threshold process conditions in the chamber, or the like. Models may include physics-based models, such as physics-based digital twin models. Models may include data-based models, such as machine learning models. Models may include statistical models, holistic models, rule-based models, combinations of models or types of models, etc.

Models may be used to predict one or more properties of a substrate process operation. Properties may include chamber conditions, substrate conditions, hardware conditions, etc. Models indicative of chamber performance quality may be based on physical chamber conditions or virtual chamber conditions. Models based on physical chamber conditions may be provided, as input, data associated with performance of one or more process operations. For example, manufacturing parameters, substrate design parameters, and/or sensor data may be provided to one or more models. The one or more models may generate virtual sensor data, predicted substrate metrology data, or other types of data indicative of process operation performance quality. Models based on physical chamber conditions may be physics-based models. Models based on physical chamber conditions may be calibrated physics-based models. Models based on physical chamber conditions may be digital twin models. Models based on physical chamber conditions may be machine learning models, data-based models, physics-based models, rule-based models, heuristic models, statistical models, etc. Models based on physical chamber conditions may receive data based on physical performance of substrate processing operations, which may be expensive to generate in terms of processing materials, disposal of processed substrates, energy, environmental impact, etc.

Models based on virtual chamber conditions may be provided, as input, one or more virtual processing input conditions. Virtual processing input conditions may or may not correspond to physical processing input conditions (e.g., manufacturing or hardware parameters). Models based on virtual chamber conditions may be data-based models. Models based on virtual chamber conditions may be machine learning models. Models based on virtual chamber conditions may be artificial intelligence based models. Models based on virtual chamber conditions may be physics-based models, heuristic models, statistical models, rule-based models, etc. Input conditions may be provided to a model and virtual substrate processing performed. Output from one or more models may be provided, indicative of predicted operation performance quality associated with the given input conditions. Models based on virtual chamber conditions may be less costly to run, but establishing models, particularly data-based models, may involve providing a large amount of training and/or calibration data, labeling the data, ensuring that virtual chamber performance and physical chamber performance remain consistent, etc.

In some systems, various types of models are accessed, utilized, and/or understood separately. For example, models for assessing process chamber quality and/or processing operation performance quality may be separated into modeling based on sensor data of processing operations performed on physical process chambers, and modeling based on processing operations performed by virtual process chambers, such as digital twins corresponding to physical process chambers. Modeling based on physical process operations may be used in assessing chamber performance, predicting substrate metrology, etc. Modeling based on virtual process operations may be used in predicting results of a process recipe under development, predicting process conditions and/or substrate properties, etc. Such categories of models may be of different construction (e.g., physics-based vs. data-based models). Such categories may be of differing usefulness to different users. Models may be accessed via different platforms or applications in some systems. For a user interested in quality of a chamber, multiple models may be of use, which may be difficult or inconvenient to access via various model platforms.

In some systems, various models may exist for a particular process chamber, process chamber type, process operation, or the like. For example, one or more models may be utilized to predict or assess substrate properties, one or more models may be utilized to predict temperatures of the process chamber or substrate, models may be utilized to predict magnetic field properties, models may be utilized to predict plasma properties, etc. Such models may be accessed via different computing devices, different platforms, different applications, or the like. Such separation of models may cause inconvenience or difficulty in building an understanding of process chamber quality.

In some systems, models associated with various process chambers may be further separated. For example, a tool may include a number of process chambers configured to perform different types of process operations, such as deposition operations, etch operations, anneal operations, lithography operations, etc. The tool may include chambers for performing physical vapor deposition (PVD) operations, chemical vapor deposition (CVD) operations, atomic layer deposition (ALD) operations, etch operations, lithography operations, etc. To view performance data associated with a process tool including more than one chamber, models associated with individual chambers and/or individual chamber types may be accessed via different platforms, applications, or the like. Such separation of models may cause inconvenience or difficulty in displaying data indicative of performance quality of a process tool.

In some systems, models associated with various tools or manufacturing facilities may be further separated. In a similar manner to separation of models associated with various chambers, accessing, by a user, models or model data associated with different tools or different facilities may be inconvenient, difficult, and/or expensive in terms of time, training, expertise, etc. Such separation of models may cause inconvenience or difficulty in displaying data indicative of performance quality of a manufacturing facility or set of facilities.

Methods and systems of the present disclosure may address one or more shortcomings of conventional solutions. A comprehensive manufacturing equipment performance quality application, program, platform, or the like may be constructed. The comprehensive platform may provide, to a user, access to many models associated with performance of manufacturing equipment. The comprehensive platform may provide access to models predicting various properties associated with the manufacturing equipment. The comprehensive platform may provide access to models associated with various tools, processing operations, chambers, facilities, etc. The comprehensive platform may provide access to models that generate predictions based on physical processing operations of the manufacturing equipment. The comprehensive platform may provide access to models that generate predictions based on virtual process operations of the manufacturing equipment. The comprehensive platform may provide various data displays for displaying process operation data, process operation performance quality data, etc. The comprehensive platform may be utilized in improving process recipes. The comprehensive platform may be utilized in developing process recipes. The comprehensive platform may be utilized in identifying manufacturing faults. The comprehensive platform may be utilized in determining root causes of manufacturing faults. The comprehensive platform may be utilized in identifying drifting and/or aging of manufacturing equipment. The comprehensive platform may be utilized in identifying failure of one or more components of manufacturing equipment. The comprehensive platform may be utilized in recommending maintenance for manufacturing equipment. The comprehensive platform may be utilized in recommending replacement of one or more components of manufacturing equipment.

The comprehensive platform may enable selection of a target process chamber. Selection of the target process chamber may include selection of a manufacturing facility, selection of a tool including the target process chamber, selection of a type or category of chamber, selection of a type of process operation associated with the chamber, selection of a substrate type associated with the chamber, or the like.

The comprehensive platform may provide a list-type selection of a process chamber. The comprehensive platform may provide a graphical selection of a process chamber. The comprehensive platform may provide a combination or election of graphical, list-type, or other types of selection. In some embodiments, a graphical representation of a selected tool may be presented, with selection of a target chamber performed by selecting a graphical user interface (GUI) element associated with the chamber from the graphical representation.

Modeling capabilities associated with a process chamber may be provided to a user responsive to chamber selection. Models may be configured to reflect the associated process chamber, e.g., PVD chambers may be associated with PVD virtual models, ALD chambers may be associated with ALD virtual models, etch chambers may be associated with etch models, etc. In some embodiments, selection of categories of modeling capabilities and data access may be presented. For example, a first selection may be associated with data collected from physical processing operations performed previously in the chamber (e.g., a "monitor" data mode). A second selection may be associated with data collected from virtual processing operations performed in a virtual chamber (e.g., an "explore" data mode). Modeling operations may be performed upon user selection, request, instruction, or the like. In some cases, modeling operations may have been performed previously and output data of the modeling may be displayed response to a user action.

In some embodiments, user selection of a chamber, a category of models, target data, or the like results in display of one or more sets of data via a GUI. Further division into categories may be performed by the comprehensive platform. For example, a monitor data mode may be divided into virtual sensor data (e.g., sensor data provided from physics-based and/or digital twin models based on chamber sensor data) and measured sensor data (e.g., data from chamber sensors, metrology tools, or the like). An explore data mode may be divided into a predictor mode (e.g., input to one or more models includes process/simulation knobs, output includes indications of quality of performance) and an explorer mode (e.g., input to one or more models includes target output of a process, output includes the process knob inputs that are predicted to result in the target output). Various data presentations, including histograms, time traces, substrate property maps, or other data presentation methods may be provided via the GUI.

Systems and methods of the present disclosure provide advantages over conventional methods. By providing a comprehensive platform for models associated with manufacturing equipment quality, cost of operations to improve processing quality may be decreased, in terms of user time, training for user expertise, confidence and accuracy of adjustments made to the manufacturing equipment, etc. Further, including multiple modeling frameworks in a single comprehensive platform enables cross checking to monitor for chamber degradation, model degradation, component failure, required maintenance, chamber aging, and the like. Including access to many models of different construction, design, intent, type, category, etc., in a single comprehensive platform enables a more thorough understanding of chamber performance, which may improve outcomes associated with chamber maintenance, chamber and recipe design, substrate design, substrate manufacturing, etc.

In one aspect of the present disclosure, a method includes receiving, via a graphical user interface (GUI), by a processing device, a first user selection to view data associated with a first process chamber in a first chamber data mode. Data of the first chamber data mode includes data of a process operation performed in the first process chamber. The method further includes providing, for display on the GUI, first display data of the first data chamber mode responsive to receiving the first user selection. The method further includes receiving a second user selection to view data associated with the first process chamber in a second chamber data mode. Data of the second chamber data mode includes data of a virtual process operation performed by a virtual representation of the first process chamber. The method further includes providing, for display on the GUI, second display data of the second data chamber mode responsive to receiving the second user selection.

In another aspect of the present disclosure, a method includes outputting, by a processing device, a view of a manufacturing system. The manufacturing system includes a number of process chambers. The manufacturing system further includes one or more transfer chambers. The manufacturing system further includes one or more load locks. The view includes, for each process chamber of the manufacturing system, a graphical representation of the process chamber. The view further includes one or more view options for data associated with the process chambers of the manufacturing system. The method further includes receiving a selection of a view option for a process chamber from the one or more view options of the plurality of process chambers. The method further includes loading one or more virtual models associated with the selected process chamber and the selected view option. Each process chamber is associated with one or more virtual models configured for that process chamber.

In another aspect of the present disclosure, a method includes receiving, via a GUI of a modeling platform, a first user selection of a first process chamber. The method further includes, responsive to receiving the first user selection of the first process chamber, providing, to a first model, first input data. The first input data includes sensor data from the first process chamber. The method further includes obtaining, from the first model, first output data. The first output data includes predictive data associated with the sensor data from the first process chamber. The method further includes, responsive to receiving the first user selection of the first process chamber, providing, to a second model, second input data. The second input data includes simulation inputs of a virtual substrate processing operation. The method further includes obtaining, from the second model, second output data. The second output data includes predictive data of the virtual substrate processing operation. The method further includes providing the first output data and the second output data for display on the GUI of the modeling platform.

Embodiments are discussed with reference to a GUI for a modeling platform, and discuss user selections of options displayed within and/or associated with the GUI (e.g., for process parameters, modeling parameters, recipes, and so on), such as by clicking on drop down menus and/or other GUI elements. However, it should be understood that user inputs may also be received in other ways. For example, a user input may be received as a prompt to a large language model (LLM) or other artificial intelligence (AI) model such as a generative model. The prompt may be provided by voice and/or text, and may provide a description of GUI elements, process parameters, model parameters, etc. that a user wants to select. The LLM or other AI model may process the prompt to determine selections to be made within an application associated with the GUI, and may send instructions to the application associated with the GUI to implement the selection. For example, a prompt may indicate a set of model parameters via voice or text. The LLM or other AI model may process the prompt to determine the set of model parameters, and may then send instructions to the application associated with the GUI to select the set of model parameters.

An LLM is a type of artificial intelligence model designed to understand, generate, and manipulate human language. These models are trained on vast amounts of text data to learn patterns in language, such as grammar, facts, and context. The "large" in LLM refers to the size of the model, which is typically characterized by the number of parameters (e.g., variables or "weights") the model has, often in the billions or even trillions. An example of an LLM is GPT-4.

In some embodiments, instead of a traditional user interface where a user enters input values or selects input entries from a menu, a user provides inputs via a 'conversational' interaction with the system (e.g., using an LLM).

FIG. 1 is a block diagram illustrating an exemplary system 100 (exemplary system architecture), according to some embodiments. The system 100 includes a client device 120, manufacturing equipment 124, sensors 126, metrology equipment 128, predictive server 112, and data store 140. The predictive server 112 may be part of predictive system 110. Predictive system 110 may further include server machines 170 and 180.

Sensors 126 may provide sensor data 142 associated with manufacturing equipment 124 (e.g., associated with producing, by manufacturing equipment 124, corresponding products, such as substrates). Sensor data 142 may be used to ascertain equipment health and/or product health (e.g., product quality). Manufacturing equipment 124 may produce products following a recipe or performing runs over a period of time. In some embodiments, sensor data 142 may include values of one or more of optical sensor data, spectral data, temperature (e.g., heater temperature), spacing (SP), pressure, High Frequency Radio Frequency (HFRF), radio frequency (RF) match voltage, RF match current, RF match capacitor position, voltage of Electrostatic Chuck (ESC), actuator position, electrical current, flow, power, voltage, etc. Sensor data 142 may include historical sensor data 144 and current sensor data 146. Current sensor data 146 may be associated with a product currently being processed, a product recently processed, a number of recently processed products, etc. Current sensor data 146 may be used as input to a model, e.g., to generate predictive data 168, virtual sensor data 167, etc. Historical sensor data 144 may include data stored associated with previously produced products. Historical sensor data 144 may be used to train and/or calibrate a model, e.g., model 190. Historical sensor data 144 and/or current sensor data 146 may include attribute data, e.g., labels of manufacturing equipment ID or design, sensor ID, type, and/or location, label of a state of manufacturing equipment, such as a present fault, service lifetime, etc.

Sensor data 142 may be associated with or indicative of manufacturing parameters such as hardware parameters (e.g., hardware settings or indications of installed components, e.g., size, make, model, type, etc.) of manufacturing equipment 124 or process parameters (e.g., heater settings, gas flow, etc.) of manufacturing equipment 124. Data associated with some hardware parameters and/or process parameters may, instead or additionally, be stored as manufacturing parameters 150, which may include historical manufacturing parameters (e.g., associated with historical processing runs) and current manufacturing parameters. Manufacturing parameters 150 may be indicative of input settings to the manufacturing device (e.g., heater power, gas flow, etc.). Sensor data 142 and/or manufacturing parameters 150 may be provided while the manufacturing equipment 124 is performing manufacturing processes (e.g., equipment readings while processing products). Sensor data 142 may be different for each product (e.g., each substrate). Substrates may have property values (film thickness, film strain, etc.) measured by metrology equipment 128. Metrology equipment 128 may include equipment included in a process tool or chamber, metrology equipment integrated with a tool, metrology equipment in a standalone facility, etc. Metrology data 160 may be a component of data store 140. Metrology data 160 may include historical metrology data (e.g., metrology data associated with previously processed products).

In some embodiments, metrology data 160 may be provided without use of a standalone metrology facility, e.g., in-situ metrology data (e.g., metrology or a proxy for metrology collected during processing), integrated metrology data (e.g., metrology or a proxy for metrology collected while a product is within a chamber or under vacuum, but not during processing operations), inline metrology data (e.g., data collected after a substrate is removed from vacuum), etc. Metrology data 160 may include current metrology data (e.g., metrology data associated with a product currently or recently processed).

In some embodiments, sensor data 142, metrology data 160, or manufacturing parameters 150 may be processed (e.g., by the client device 120 and/or by the predictive server 112). Processing of the sensor data 142 may include generating features. In some embodiments, the features are a pattern in the sensor data 142, metrology data 160, and/or manufacturing parameters 150 (e.g., slope, width, height, peak, etc.). In some embodiments, the features are a combination of values from the sensor data 142, metrology data 160, and/or manufacturing parameters 150 (e.g., power derived from voltage and current, etc.). Sensor data 142 may include features and the features may be used by predictive component 114 for performing signal processing and/or for obtaining predictive data 168. Predictive data 168 (e.g., including virtual sensor data 167, virtual substrate data 169, or other types of predictive data) may be used for performance of a corrective action. Predictive data 168 may be presented to a user, e.g., via a graphical user interface, via client device 120, or the like.

Each instance (e.g., set) of sensor data 142 may correspond to a product (e.g., a substrate), a set of manufacturing equipment, a type of substrate produced by manufacturing equipment, or the like. Each instance of metrology data 160 and manufacturing parameters 150 may likewise correspond to a product, a set of manufacturing equipment, a type of substrate produced by manufacturing equipment, or the like. The data store may further store information associating sets of different data types, e.g. information indicative that a set of sensor data, a set of metrology data, and a set of manufacturing parameters are all associated with the same product, manufacturing equipment, type of substrate, etc.

In some embodiments, predictive system 110 may generate predictive data 168 using supervised machine learning. Supervised machine learning may include utilizing a machine learning model that was trained using labeled data. Labeled data may include sensor data labeled with metrology data, sensor data labeled with probe data to generate virtual sensor data, manufacturing parameters labeled with sensor data or metrology data, etc. Labeled data may include any training input data of interest in connection with outcome data. Physics-based models may be calibrated in a similar way, by using some labeled data to correct or adjust one or more parameters of a physics-based model. In some embodiments, predictive system 110 may generate predictive data 168 using unsupervised machine learning. For example, predictive data 168 includes output from a machine learning model that was trained using unlabeled data, output may include clustering results, principle component analysis, anomaly detection, etc. In some embodiments, predictive system 110 may generate predictive data 168 using semi-supervised learning. For example, training data may include a mix of labeled and unlabeled data, etc.

Client device 120, manufacturing equipment 124, sensors 126, metrology equipment 128, predictive server 112, data store 140, server machine 170, and server machine 180 may be coupled to each other via network 130 for generating predictive data 168 to perform corrective actions. In some embodiments, network 130 may provide access to cloud-based services. Operations performed by client device 120, predictive system 110, data store 140 etc., may be performed by virtual cloud-based devices.

In some embodiments, network 130 is a public network that provides client device 120 with access to the predictive server 112, data store 140, and other publicly available computing devices. In some embodiments, network 130 is a private network that provides client device 120 access to manufacturing equipment 124, sensors 126, metrology equipment 128, data store 140, and other privately available computing devices. Network 130 may include one or more Wide Area Networks (WANs), Local Area Networks (LANs), wired networks (e.g., Ethernet network), wireless networks (e.g., an 802.11 network or a Wi-Fi network), cellular networks (e.g., a Long Term Evolution (LTE) network), routers, hubs, switches, server computers, cloud computing networks, and/or a combination thereof.

Client device 120 may include computing devices such as Personal Computers (PCs), laptops, mobile phones, smart phones, tablet computers, netbook computers, network connected televisions ("smart TV"), network-connected media players (e.g., Blu-ray player), a set-top-box, Over-the-Top (OTT) streaming devices, operator boxes, etc. Client device 120 may include a corrective action component 122. Corrective action component 122 may receive user input (e.g., via a Graphical User Interface (GUI) displayed via the client device 120) of an indication associated with manufacturing equipment 124. In some embodiments, corrective action component 122 transmits the indication to the predictive system 110, receives output (e.g., predictive data 168) from the predictive system 110, determines a corrective action based on the output, and causes the corrective action to be implemented. In some embodiments, corrective action component 122 obtains sensor data 142 (e.g., current sensor data) associated with manufacturing equipment 124 (e.g., from data store 140, etc.) and provides sensor data 142 (e.g., current sensor data 146) associated with the manufacturing equipment 124 to predictive system 110.

In some embodiments, corrective action component 122 receives an indication of a corrective action from the predictive system 110 and causes the corrective action to be implemented. Each client device 120 may include an operating system that allows users to one or more of generate, view, or edit data (e.g., indication associated with manufacturing equipment 124, corrective actions associated with manufacturing equipment 124, etc.). Client device 120 may execute an application (e.g., a comprehensive modeling platform) including a graphical user interface to display data to a user and/or receive input from a user.

Client device 120 may cause one or more models (e.g., model 190) to be executed. Client device 120 may cause one or more machine learning models to be executed. Client device 120 may cause one or more physics-based models to be executed. Client device 120 may cause one or more statistical, rule-based, heuristic, or other types of models to be executed. Client device 120 may execute a comprehensive modeling platform for providing access to one or more models to a user.

In some embodiments, metrology data 160 (e.g., historical metrology data) corresponds to historical property data of products (e.g., products processed using manufacturing parameters associated with historical sensor data 144 and historical manufacturing parameters of manufacturing parameters 150) and predictive data 168 is associated with predicted property data (e.g., of products to be produced or that have been produced in conditions recorded by current sensor data 146 and/or current manufacturing parameters). In some embodiments, predictive data 168 is or includes predicted metrology data (e.g., virtual metrology data) of the products to be produced or that have been produced according to conditions recorded as current sensor data 146, current measurement data, current metrology data and/or current manufacturing parameters. In some embodiments, predictive data 168 is or includes an indication of any abnormalities (e.g., abnormal products, abnormal components, abnormal manufacturing equipment 124, abnormal energy usage, etc.) and optionally one or more causes of the abnormalities. In some embodiments, predictive data 168 is an indication of change over time or drift in some component of manufacturing equipment 124, sensors 126, metrology equipment 128, and the like. In some embodiments, predictive data 168 is an indication of an end of life of a component of manufacturing equipment 124, sensors 126, metrology equipment 128, or the like. In some embodiments, predictive data 168 is an indication of progress of a processing operation being performed, e.g., to be used for process control.

In some embodiments, a comprehensive modeling platform may be utilized for generating, viewing, manipulating, etc., data associated with one or more process chambers. The comprehensive modeling platform may be used to execute a number of models, including models of different types, construction, function, category, etc. The comprehensive modeling platform may execute one or more models for generating virtual sensor data 167. Virtual sensor data 167 may be data that is modeled based on sensor data received from sensors 126 of manufacturing equipment 124. The comprehensive modeling platform may execute one or more models for generating virtual substrate data 169. Virtual substrate data 169 may include data generated by one or more models executing virtual substrate processing operations. For example, virtual substrate data 169 may be data generated in association with a digital twin model of a process chamber, a virtual process operation of a virtual process chamber, etc. As used herein, a digital twin model is a virtual model of a physical object (e.g., process chamber). It may span the object's lifecycle and uses real-time data sent from sensors on the object to simulate the behavior and monitor operations of the object. A digital twin of a process chamber may be configured to perform in a way that emulates the physical process chamber, when the physical and digital process chambers are provided corresponding inputs (e.g., process inputs corresponding to simulation inputs). A digital twin model may be or include a physics-based model, a data-based (e.g., machine learning) model, a hybrid model (including features of both data-based and physics-based models), etc.

A comprehensive modeling platform may enable execution of a large number of models associated with a substrate processing chamber. Analysis of chamber performance may include monitoring of performance of physical process operations performed in a physical chamber. Analysis of chamber performance may include executing virtual process operations in a virtual process chamber (e.g., digital twin). Analysis of chamber performance may include monitoring of performance of virtual process operations. Analysis of physical processing operations may enable performance of corrective actions, e.g., by indicating recommended recipe updates, recommended maintenance, failing and/or aging chamber components, etc. Performance and analysis of virtual processing operations may provide similar benefits, in addition to providing means to test substrate processing operations (e.g., during process recipe development) without costs associated with physical substrate processing, such as materials, energy, chamber time, disposal of resulting substrates, environmental impact, etc. Further, comparison of physical and virtual chamber performance may provide indications of chamber component aging or failing, recommended maintenance, recommended corrective actions, etc.

Performing manufacturing processes that result in defective products can be costly in time, energy, products, components, manufacturing equipment 124, the cost of identifying the defects and discarding the defective product, etc. By inputting sensor data 142 (e.g., manufacturing parameters that are being used or are to be used to manufacture a product) into predictive system 110, receiving output of predictive data 168, and performing a corrective action based on the predictive data 168, system 100 can have the technical advantage of avoiding the cost of producing, identifying, and discarding defective products.

Performing manufacturing processes that result in failure of the components of the manufacturing equipment 124 can be costly in downtime, damage to products, damage to equipment, express ordering replacement components, etc. By inputting sensor data 142 (e.g., indicative of manufacturing parameters that are being used or are to be used to manufacture a product), manufacturing parameters 150, metrology data, measurement data, etc., to a model 190, receiving output of predictive data 168, and performing corrective action (e.g., predicted operational maintenance, such as replacement, processing, cleaning, etc. of components) based on the predictive data 168, system 100 can have the technical advantage of avoiding the cost of one or more of unexpected component failure, unscheduled downtime, productivity loss, unexpected equipment failure, product scrap, or the like. Monitoring the performance over time of components, e.g. manufacturing equipment 124, sensors 126, metrology equipment 128, virtual and physical process chambers, and the like, may provide indications of degrading components.

Manufacturing parameters may be suboptimal for producing product which may have costly results of increased resource (e.g., energy, coolant, gases, etc.) consumption, increased amount of time to produce the products, increased component failure, increased amounts of defective products, etc. By inputting input data indicative of manufacturing processes to a model 190, receiving output from the model, and performing (e.g., based on model-generated predictive data 168) a corrective action of updating manufacturing parameters (e.g., setting optimal manufacturing parameters), system 100 can have the technical advantage of using optimal manufacturing parameters (e.g., hardware parameters, process parameters, optimal design) to avoid costly results of suboptimal manufacturing parameters.

Corrective actions may be associated with one or more of Computational Process Control (CPC), Statistical Process Control (SPC) (e.g., SPC on electronic components to determine process in control, SPC to predict useful lifespan of components, SPC to compare to a graph of 3-sigma, etc.), Advanced Process Control (APC), model-based process control, preventative operative maintenance, design optimization, updating of manufacturing parameters, updating manufacturing recipes, feedback control, machine learning modification, or the like.

In some embodiments, the corrective action includes providing an alert (e.g., an alarm to stop or not perform the manufacturing process if the predictive data 168 indicates a predicted abnormality, such as an abnormality of the product, a component, or manufacturing equipment 124). In some embodiments, a machine learning model is trained to monitor the progress of a processing run (e.g., monitor in-situ sensor data to predict if a manufacturing process has reached completion). In some embodiments, the machine learning model may send instructions to end a processing run when the model determines that the process is complete. In some embodiments, the corrective action includes providing feedback control (e.g., modifying a manufacturing parameter responsive to the predictive data 168 indicating a predicted abnormality). In some embodiments, performance of the corrective action includes causing updates to one or more manufacturing parameters. In some embodiments performance of a corrective action may include retraining a machine learning model associated with manufacturing equipment 124. In some embodiments, performance of a corrective action may include training a new machine learning model associated with manufacturing equipment 124. In some embodiments, performance of a corrective action may include recalibration of a physics-based model. In some embodiments, performance of a corrective action may include providing an indication of anomalous data to a user, e.g., via a graphical user interface (GUI).

Manufacturing parameters 150 may include hardware parameters (e.g., information indicative of which components are installed in manufacturing equipment 124, indicative of component replacements, indicative of component age, indicative of software version or updates, etc.) and/or process parameters (e.g., temperature, pressure, flow, rate, electrical current, voltage, gas flow, lift speed, etc.). In some embodiments, the corrective action includes causing preventative operative maintenance (e.g., replace, process, clean, etc. components of the manufacturing equipment 124). In some embodiments, the corrective action includes causing design optimization (e.g., updating manufacturing parameters, manufacturing processes, manufacturing equipment 124, etc. for an optimized product). In some embodiments, the corrective action includes a updating a recipe (e.g., altering the timing of manufacturing subsystems entering an idle or active mode, altering set points of various property values, etc.).

Predictive server 112, server machine 170, and server machine 180 may each include one or more computing devices such as a rackmount server, a router computer, a server computer, a personal computer, a mainframe computer, a laptop computer, a tablet computer, a desktop computer, Graphics Processing Unit (GPU), accelerator Application-Specific Integrated Circuit (ASIC) (e.g., Tensor Processing Unit (TPU)), etc. Computing techniques may include edge computing. Operations of predictive server 112, server machine 170, server machine 180, data store 140, etc., may be performed by a cloud computing service, cloud data storage service, etc.

Predictive server 112 may include a predictive component 114. In some embodiments, the predictive component 114 may receive current sensor data 146, and/or current manufacturing parameters (e.g., receive from the client device 120, retrieve from the data store 140) and generate output (e.g., predictive data 168) for performing corrective action associated with the manufacturing equipment 124 based on the current data. In some embodiments, predictive data 168 may include one or more predicted dimension measurements of a processed product. In some embodiments, predictive component 114 may use one or more trained machine learning models 190 to determine the output for performing the corrective action based on current data. In some embodiments, predictive component 114 may utilize one or more physics-based models. In some embodiments, predictive component 114 may utilize one or more statistical, heuristic, rule-based, or other types of models for generating predictive data 168.

Manufacturing equipment 124 may be associated with one or more machine leaning models, e.g., model 190. Machine learning models associated with manufacturing equipment 124 may perform many tasks, including process control, classification, performance predictions, etc. Model 190 may be trained using data associated with manufacturing equipment 124 or products processed by manufacturing equipment 124, e.g., sensor data 142 (e.g., collected by sensors 126), manufacturing parameters 150 (e.g., associated with process control of manufacturing equipment 124), metrology data 160 (e.g., generated by metrology equipment 128), etc. Other types of models may operate similarly, e.g., a physics-based model associated with manufacturing equipment 124 may be calibrated using data associated with manufacturing equipment 124 in a similar manner to training a machine learning model (e.g., updating one or more parameters of the model based on an error term between output and target output of the model). In some embodiments, calibrating a physics-based model may consume far less data than training a machine learning model.

One type of machine learning model that may be used to perform some or all of the above tasks is an artificial neural network, such as a deep neural network. Artificial neural networks generally include a feature representation component with a classifier or regression layers that map features to a desired output space. A convolutional neural network (CNN), for example, hosts multiple layers of convolutional filters. Pooling is performed, and non-linearities may be addressed, at lower layers, on top of which a multi-layer perceptron is commonly appended, mapping top layer features extracted by the convolutional layers to decisions (e.g. classification outputs).

A recurrent neural network (RNN) is another type of machine learning model. A recurrent neural network model is designed to interpret a series of inputs where inputs are intrinsically related to one another, e.g., time trace data, sequential data, etc. Output of a perceptron of an RNN is fed back into the perceptron as input, to generate the next output.

Deep learning is a class of machine learning algorithms that use a cascade of multiple layers of nonlinear processing units for feature extraction and transformation. Each successive layer uses the output from the previous layer as input. Deep neural networks may learn in a supervised (e.g., classification) and/or unsupervised (e.g., pattern analysis) manner. Deep neural networks include a hierarchy of layers, where the different layers learn different levels of representations that correspond to different levels of abstraction. In deep learning, each level learns to transform its input data into a slightly more abstract and composite representation. In an image recognition application, for example, the raw input may be a matrix of pixels; the first representational layer may abstract the pixels and encode edges; the second layer may compose and encode arrangements of edges; the third layer may encode higher level shapes (e.g., teeth, lips, gums, etc.); and the fourth layer may recognize a scanning role. Notably, a deep learning process can learn which features to optimally place in which level on its own. The "deep" in "deep learning" refers to the number of layers through which the data is transformed. More precisely, deep learning systems have a substantial credit assignment path (CAP) depth. The CAP is the chain of transformations from input to output. CAPs describe potentially causal connections between input and output. For a feedforward neural network, the depth of the CAPs may be that of the network and may be the number of hidden layers plus one. For recurrent neural networks, in which a signal may propagate through a layer more than once, the CAP depth is potentially unlimited.

In some embodiments, a user utilizes a comprehensive modeling platform to provide predictive component 114 with current sensor data 146, current metrology data and/or current manufacturing parameters. Predictive component 114 may the perform signal processing to break down the current data into sets of current data, provide the sets of current data as input to a trained model 190, and obtain outputs indicative of predictive data 168 from the trained model 190. In some embodiments, predictive component 114 receives metrology data (e.g., predicted metrology data based on sensor data) of a substrate and provides the metrology data to trained model 190. For example, current sensor data 146 may include sensor data indicative of metrology (e.g., geometry) of a substrate and/or other patterns of features or structures of the substrate. Model 190 may be configured to accept data indicative of substrate metrology and generate as output a set of process inputs predicted to result in a substrate with the target geometry.

In some embodiments, the various models discussed in connection with model 190 (e.g., supervised machine learning model, unsupervised machine learning model, physics-based digital twin model, etc.) may be combined in one model (e.g., an ensemble model), or may be separate models.

Data may be passed back and forth between several distinct models included in model 190, and predictive component 114. In some embodiments, some or all of these operations may instead be performed by a different device, e.g., client device 120, server machine 170, server machine 180, etc. It will be understood by one of ordinary skill in the art that variations in data flow, which components perform which processes, which models are provided with which data, and the like are within the scope of this disclosure.

Data store 140 may be a memory (e.g., random access memory), a drive (e.g., a hard drive, a flash drive), a database system, a cloud-accessible memory system, or another type of component or device capable of storing data. Data store 140 may include multiple storage components (e.g., multiple drives or multiple databases) that may span multiple computing devices (e.g., multiple server computers). The data store 140 may store sensor data 142, manufacturing parameters 150, metrology data 160, and predictive data 168.

Sensor data 142 may include historical sensor data 144 and current sensor data 146. Sensor data may include sensor data time traces over the duration of manufacturing processes, associations of data with physical sensors, preprocessed data, such as averages and composite data, and data indicative of sensor performance over time (i.e., many manufacturing processes). Manufacturing parameters 150 and metrology data 160 may contain similar features, e.g., historical metrology data and current metrology data. Historical sensor data 144, historical metrology data, and historical manufacturing parameters may be historical data (e.g., at least a portion of these data may be used for training or calibrating model 190). Current sensor data 146, current metrology data, may be current data (e.g., at least a portion to be input into model 190, subsequent to the historical data) for which predictive data 168 is to be generated (e.g., for performing corrective actions).

In some embodiments, predictive system 110 further includes server machine 170 and server machine 180. Server machine 170 includes a data set generator 172 that is capable of generating data sets (e.g., a set of data inputs and a set of target outputs) to train, validate, and/or test model(s) 190, including one or more machine learning models. Some operations of data set generator 172 are described in detail below with respect to FIGS. 2A-B and 4A. In some embodiments, data set generator 172 may partition the historical data (e.g., historical sensor data 144, historical manufacturing parameters, historical metrology data) into a training set (e.g., sixty percent of the historical data), a validating set (e.g., twenty percent of the historical data), and a testing set (e.g., twenty percent of the historical data).

In some embodiments, predictive system 110 (e.g., via predictive component 114) generates multiple sets of features. For example a first set of features may correspond to a first set of types of sensor data (e.g., from a first set of sensors, first combination of values from first set of sensors, first patterns in the values from the first set of sensors) that correspond to each of the data sets (e.g., training set, validation set, and testing set) and a second set of features may correspond to a second set of types of sensor data (e.g., from a second set of sensors different from the first set of sensors, second combination of values different from the first combination, second patterns different from the first patterns) that correspond to each of the data sets.

In some embodiments, model 190 is provided historical data as training data (e.g., in the case of a machine learning model). In some embodiments, model 190 is provided historical data as calibration data (e.g., in the case of a physics-based model). The type of data provided will vary depending on the intended use of the model. For example, a machine learning model may be trained by providing the model with historical sensor data 144 as training input and corresponding metrology data 160 as target output. In some embodiments, a large volume of data is used to train model 190, e.g., sensor and metrology data of hundreds of substrates may be used. In some embodiments, a fairly small volume of data may be used to calibrate a physics-based model 190.

Server machine 180 includes a training engine 182, a validation engine 184, selection engine 185, and/or a testing engine 186. An engine (e.g., training engine 182, a validation engine 184, selection engine 185, and a testing engine 186) may refer to hardware (e.g., circuitry, dedicated logic, programmable logic, microcode, processing device, etc.), software (such as instructions run on a processing device, a general purpose computer system, or a dedicated machine), firmware, microcode, or a combination thereof. The training engine 182 may be capable of training or calibrating a model 190 using one or more sets of features associated with the training set from data set generator 172. The training engine 182 may generate multiple trained models 190, where each trained model 190 corresponds to a distinct set of features of the training set (e.g., sensor data from a distinct set of sensors). For example, a first trained model may have been trained using all features (e.g., X1-X5), a second trained model may have been trained using a first subset of the features (e.g., X1, X2, X4), and a third trained model may have been trained using a second subset of the features (e.g., X1, X3, X4, and X5) that may partially overlap the first subset of features.

Validation engine 184 may be capable of validating a trained model 190 using a corresponding set of features of the validation set from data set generator 172. For example, a first trained machine learning model 190 that was trained using a first set of features of the training set may be validated using the first set of features of the validation set. The validation engine 184 may determine an accuracy of each of the trained models 190 based on the corresponding sets of features of the validation set. Validation engine 184 may discard trained models 190 that have an accuracy that does not meet a threshold accuracy. In some embodiments, selection engine 185 may be capable of selecting one or more trained models 190 that have an accuracy that meets a threshold accuracy. In some embodiments, selection engine 185 may be capable of selecting the trained model 190 that has the highest accuracy of the trained models 190.

Testing engine 186 may be capable of testing a trained model 190 using a corresponding set of features of a testing set from data set generator 172. For example, a first trained machine learning model 190 that was trained using a first set of features of the training set may be tested using the first set of features of the testing set. Testing engine 186 may determine a trained model 190 that has the highest accuracy of all of the trained models based on the testing sets.

In the case of a machine learning model, model 190 may refer to the model artifact that is created by training engine 182 using a training set that includes data inputs and corresponding target outputs (correct answers for respective training inputs). Patterns in the data sets can be found that map the data input to the target output (the correct answer), and machine learning model 190 is provided mappings that capture these patterns. The machine learning model 190 may use one or more of Support Vector Machine (SVM), Radial Basis Function (RBF), clustering, supervised machine learning, semi-supervised machine learning, unsupervised machine learning, k-Nearest Neighbor algorithm (k-NN), linear regression, random forest, neural network (e.g., artificial neural network, recurrent neural network), etc.

Predictive component 114 may provide current data to model 190 and may run model 190 on the input to obtain one or more outputs. For example, predictive component 114 may provide current sensor data 146 to model 190 and may run model 190 on the input to obtain one or more outputs. Predictive component 114 may be capable of determining (e.g., extracting) predictive data 168 from the output of model 190. Predictive component 114 may determine (e.g., extract) confidence data from the output that indicates a level of confidence that predictive data 168 is an accurate predictor of a process associated with the input data for products produced or to be produced using the manufacturing equipment 124 at the current sensor data 146 and/or current manufacturing parameters. Predictive component 114 or corrective action component 122 may use the confidence data to decide whether to cause a corrective action associated with the manufacturing equipment 124 based on predictive data 168.

The confidence data may include or indicate a level of confidence that the predictive data 168 is an accurate prediction for products or components associated with at least a portion of the input data. In one example, the level of confidence is a real number between 0 and 1 inclusive, where 0 indicates no confidence that the predictive data 168 is an accurate prediction for products processed according to input data or component health of components of manufacturing equipment 124 and 1 indicates absolute confidence that the predictive data 168 accurately predicts properties of products processed according to input data or component health of components of manufacturing equipment 124. Responsive to the confidence data indicating a level of confidence below a threshold level for a predetermined number of instances (e.g., percentage of instances, frequency of instances, total number of instances, etc.) predictive component 114 may cause trained model 190 to be re-trained (e.g., based on current sensor data 146, current manufacturing parameters, etc.). In some embodiments, retraining may include generating one or more data sets (e.g., via data set generator 172) utilizing historical data and/or synthetic data.

For purpose of illustration, rather than limitation, aspects of the disclosure describe the training of one or more machine learning models 190 using historical data (e.g., historical sensor data 144, historical manufacturing parameters) and synthetic data 162 and inputting current data (e.g., current sensor data 146, current manufacturing parameters, and current metrology data) into the one or more trained machine learning models to determine predictive data 168. In other embodiments, a heuristic model, physics-based model, or rule-based model is used to determine predictive data 168 (e.g., without using a trained machine learning model). In some embodiments, such models may be trained using historical and/or synthetic data. In some embodiments, these models may be retrained utilizing a combination of true historical data and synthetic data. Predictive component 114 may monitor historical sensor data 144, historical manufacturing parameters, and metrology data 160. Any of the information described with respect to data inputs 210A-B of FIGS. 2A-B may be monitored or otherwise used in the heuristic, physics-based, or rule-based model.

In some embodiments, the functions of client device 120, predictive server 112, server machine 170, and server machine 180 may be provided by a fewer number of machines. For example, in some embodiments server machines 170 and 180 may be integrated into a single machine, while in some other embodiments, server machine 170, server machine 180, and predictive server 112 may be integrated into a single machine. In some embodiments, client device 120 and predictive server 112 may be integrated into a single machine. In some embodiments, functions of client device 120, predictive server 112, server machine 170, server machine 180, and data store 140 may be performed by a cloud-based service.

In general, functions described in one embodiment as being performed by client device 120, predictive server 112, server machine 170, and server machine 180 can also be performed on predictive server 112 in other embodiments, if appropriate. In addition, the functionality attributed to a particular component can be performed by different or multiple components operating together. For example, in some embodiments, the predictive server 112 may determine the corrective action based on the predictive data 168. In another example, client device 120 may determine the predictive data 168 based on output from the trained machine learning model.

In addition, the functions of a particular component can be performed by different or multiple components operating together. One or more of the predictive server 112, server machine 170, or server machine 180 may be accessed as a service provided to other systems or devices through appropriate application programming interfaces (API).

In embodiments, a "user" may be represented as a single individual. However, other embodiments of the disclosure encompass a "user" being an entity controlled by a plurality of users and/or an automated source. For example, a set of individual users federated as a group of administrators may be considered a "user."

Figure 2A:
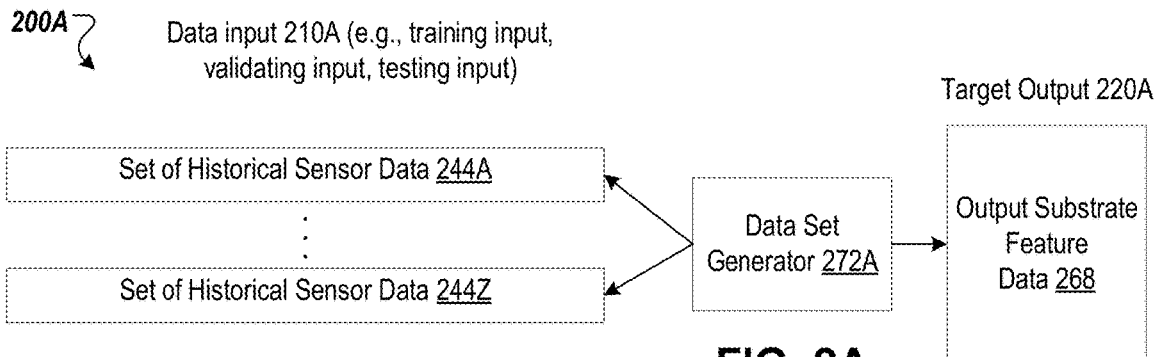
FIG. 2A depicts a block diagram of a system including an example data set generator for creating data sets for one or more supervised models, according to some embodiments.
Figure 2B:
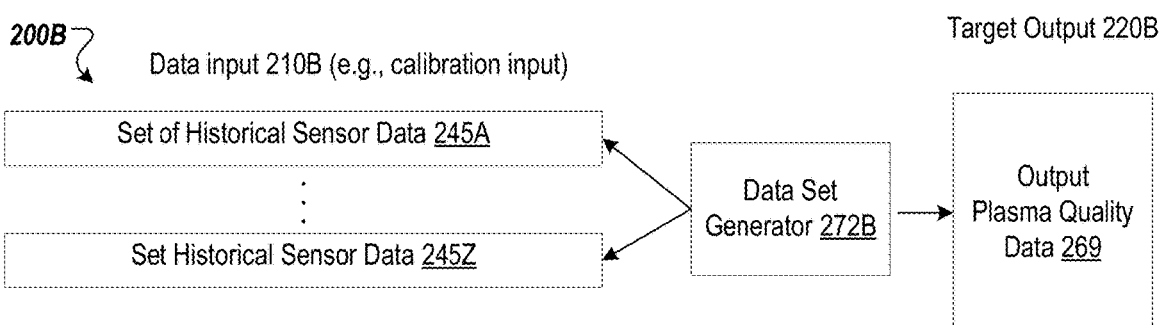
FIG. 2B depicts a block diagram of an example data set generator for creating data sets calibrating a physics-based model, according to some embodiments.

FIGS. 2A-B depict block diagrams of example data set generators 272A-B (e.g., data set generator 172 of FIG. 1) to create data sets for training, testing, validating, calibrating, etc. a model (e.g., model 190 of FIG. 1), according to some embodiments. Each data set generator 272 may be part of server machine 170 of FIG. 1. In some embodiments, several machine learning models associated with manufacturing equipment 124 may be trained, used, and maintained (e.g., within a manufacturing facility). Several physics-based models associated with manufacturing equipment 124 may be calibrated, used, and maintained. Many models associated with manufacturing equipment 124 may be maintained in association with and accessed via a comprehensive modeling platform associated with one or more process chambers, process tools, manufacturing facilities, etc. Each model may be associated with one data set generators 272, multiple models may share a data set generator 272, etc.

FIG. 2A depicts a system 200A including data set generator 272A for creating data sets for one or more supervised models (e.g., a data-based digital twin model, model 190 of FIG. 1, etc.). Data set generator 272A may create data sets (e.g., data input 210A, target output 220A) using historical data. In some embodiments, a data set generator similar to data set generator 272A may be utilized to train an unsupervised machine learning model, e.g., target output 220A may not be generated by data set generator 272A.

Data set generator 272A may be utilized for generating data sets for training a machine learning model in association with a comprehensive modeling platform. The comprehensive modeling platform may include many machine learning models. The various machine learning models may predict various chamber conditions, substrate features, changes over time, substrate conditions, etc. For example, various models may predict changes in substrate geometry over time, properties of plasma generated in an etch chamber, values of a magnetic field in a process chamber, temperature of various locations of the process chamber and/or the substrate, deformation of the substrate, etc. Each such model may be trained in a similar manner. Data sets may be generated corresponding to the intended use of each model. As an example, a data set generator for generating data sets for a model configured to receive as input data indicative of conditions in a process chamber and generate as output predictive substrate feature data is described. Any of the other machine learning models associated with a process chamber may be trained in a similar manner, by providing corresponding data for training, validating, testing, etc. For example, a model configured to receive as input set points of a plasma generation apparatus and produce as output predictions of plasma generation quality may be provided as training input sets of plasma generation parameters and as target output indications of associated plasma generation quality; a model configured to receive as input simulation inputs (e.g., virtual process parameters) and generate as output predicted substrate properties may be provided simulation inputs as training input and resulting substrate properties as target output, etc. In some embodiments, an unsupervised machine learning model may perform one or more operations, e.g., anomaly identification, which may not depend on a labeled output for configuring the model.

Data set generator 272A may generate data sets to train, test, and validate a model (e.g., a machine learning model).

In some embodiments, data set generator 272A may generate data sets for a machine learning model. The machine learning model is provided with set of historical sensor data 244A as data input 210A. The machine learning model is provided output substrate feature data 268 as target output 220A The machine learning model may be configured to accept sensor data as input data and generate substrate feature data as output, based on learning performed in response to being provided with the training data.

In some embodiments, data set generator 272A generates a data set (e.g., training set, validating set, testing set) that includes one or more data inputs 210A (e.g., training input, validating input, testing input). Data inputs 210A may be provided to training engine 182, validating engine 184, or testing engine 186. The data set may be used to train, validate, or test the model (e.g., model 190 of FIG. 1).

In some embodiments, data input 210A may include one or more sets of data. As an example, system 200A may produce sets of sensor data that may include one or more of sensor data from one or more types of sensors, combinations of sensor data from one or more types of sensors, patterns from sensor data from one or more types of sensors, or the like. Sets of data input 210A may include data describing different aspects of manufacturing, e.g., a combination of metrology data and sensor data, a combination of metrology data and manufacturing parameters, combinations of some metrology data, some manufacturing parameter data and some sensor data, etc. Data input 210A may include virtual or synthetic data, e.g., data generated by a model, data generated by a digital twin of a process chamber, or the like. For example, a first model may generate virtual sensor data associated with a substrate processing operation, and a second model may receive the virtual sensor data as input to generate further output. The second model may be trained based on data sets (e.g., data input 210A) including the virtual sensor data. Further, target output 220A may include one or more sets of data. For example, a first set may be data of a first substrate feature, property, material, geometry, or the like, a second set of target output data may be data of a second substrate feature, etc. Target output 220A may include sets of substrate feature data such as metrology data derived from one or more types of sensors, combination of metrology data derived from one or more types of sensors, patterns from metrology data, etc. In some embodiments, different models may be generated based on combinations of sets of input and/or output data.

In some embodiments, data set generator 272A may generate a first data input corresponding to a first set of historical sensor data 244A to train, validate, or test a first machine learning model. Data set generator 272A may generate a second data input corresponding to a second set of historical sensor data 244Z to train, validate, or test a second machine learning model.

In some embodiments, data set generator 272A generates a data set (e.g., training set, validating set, testing set) that includes one or more data inputs 210A (e.g., training input, validating input, testing input) and may include one or more target outputs 220A that correspond to the data inputs 210A. The data set may also include mapping data that maps the data inputs 210A to the target outputs 220A. Data inputs 210A may also be referred to as "features," "attributes," or "information." In some embodiments, data set generator 272A may provide the data set to training engine 182, validating engine 184, or testing engine 186, where the data set is used to train, validate, or test the machine learning model (e.g., one of the machine learning models that are included in model 190, ensemble model 190, etc.).

FIG. 2B depicts a block diagram of an example data set generator 272B for creating data sets for calibrating a physics-based model, according to some embodiments. A physics-based model may perform calculations based on physics occurring in a process chamber to predict outcomes based on one or more inputs. The physics-based model may include one or more parameters that are utilized in model construction to tune performance of the model. For example, there may be additional physics at play unaccounted for in the model, there may be differences in components, component thermal or electrical contact, flaws in materials, or the like (which may be within manufacturing thresholds) that alter the performance of a system compared to a model, or the like. Calibration may be performed to adjust one or more parameters of the physics-based model in accordance with the calibration data such that the virtual chamber represented by the physics-based model accurately represents the physical operations of the associated process chamber.

System 200B containing data set generator 272B (e.g., data set generator 172 of FIG. 1) creates data sets for one or more physics-based models (e.g., digital twin models, model 190 of FIG. 1, etc.). Data set generator 272B may create data sets (e.g., data input 210B) using historical data. Example data set generator 272B is configured to generate data sets for a physics-based model configured to take as input manufacturing parameter data and generate as output plasma quality data. Analogous data set generators (or analogous operations of data set generator 272B) may be utilized for physics-based models configured to perform different functions, e.g., a physics-based model configured to receive as input sensor data and generate predicted metrology data, a machine learning model configured to receive as input target metrology data (e.g., a target microscopy image) and produce as output estimated conditions or processing operation recipes that may generate a device matching the input target data, etc. Data set generator 272B may share features and/or function with data set generator 272A. In some embodiments, a physics-based model may be generated at multiple orders, e.g., multiple versions may be contemplated with various numbers of terms, parameters, or the like. A selection of a physics-based model to be utilized may include consideration of run time, accuracy, etc.

Data set generator 272B may generate data sets to calibrate a physics-based model. The physics-based model is provided with set of historical sensor data 245A as data input 210B. The physics-based model may be provided with target output 220B in accordance with intended use of the model, e.g., output plasma quality data 269 for a model configured to predict plasma generation quality based on sensor data.

The physics-based model may include two or more separate models (e.g., the physics-based model may be an ensemble model). The physics-based model may be configured to generate output data indicated performance of the processing chamber, such as an indication of an anomaly present in the processing equipment.

In some embodiments, data set generator 272B generates a data set (e.g., a calibration set) that includes one or more data inputs 210B. Data inputs 210B may also be referred to as "features," "attributes," or "information." In some embodiments, data set generator 272B may provide the data set to a calibration engine, configured to calibrate a physics-based model (e.g., model 190 of FIG. 1). Some embodiments of generating a training set are further described with respect to FIG. 4A.

In some embodiments, data set generator 272B may generate a first data input corresponding to a first set of historical sensor data 245A to calibrate a first physics-based model and the data set generator 272A may generate a second data input corresponding to a second set of historical sensor data 245Z to calibrate a second physics-based model.

Data inputs 210B to calibrate a physics-based model may include information for a particular manufacturing chamber (e.g., for particular substrate manufacturing equipment). In some embodiments, data inputs 210B may include information for a specific type of manufacturing equipment, e.g., manufacturing equipment sharing specific characteristics. Data inputs 210B may include data associated with a device of a certain type, e.g., intended function, design, produced with a particular recipe, etc. Calibrating a physics-based model based on a type of equipment, device, recipe, etc. may allow the trained model to generate plausible predictive data in a number of settings (e.g., for a number of different facilities, products, etc.).

In some embodiments, subsequent to generating a data set and training, validating, or testing a machine learning model using the data set, the model may be further trained, validated, or tested, or adjusted (e.g., adjusting weights or parameters associated with input data of the model, such as connection weights in a neural network).

Figure 3:
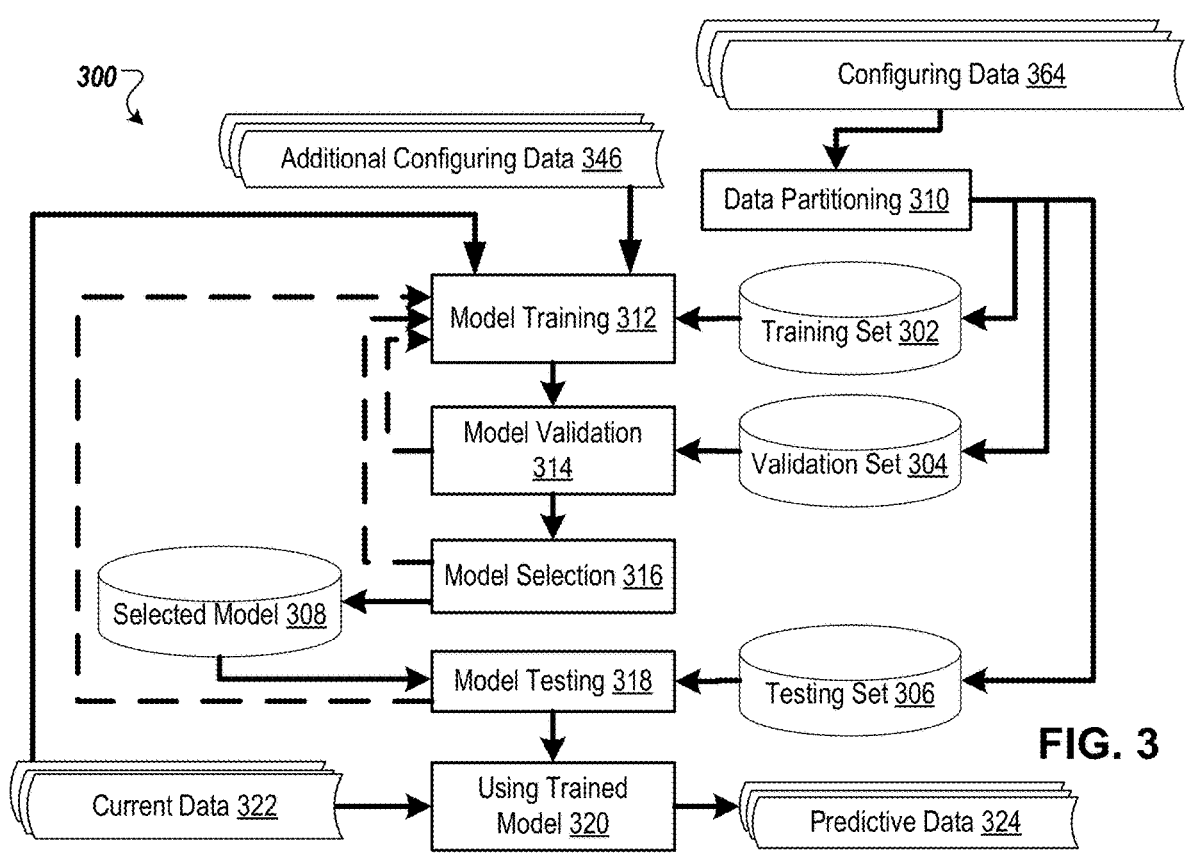
FIG. 3 is a block diagram illustrating a system for generating output data, according to some embodiments.

FIG. 3 is a block diagram illustrating system 300 for generating output data (e.g., virtual sensor data 167 and/or virtual substrate data 169 of FIG. 1), according to some embodiments. In some embodiments, system 300 may be used in conjunction with a comprehensive modeling platform. In some embodiments, system 300 may be used in conjunction with one or more machine learning models including in the comprehensive modeling platform. In some embodiments, system 300 may be used in conjunction with one or more physics-based models including in the comprehensive modeling platform. System 300 may be used in conjunction with models that generate predictive data based on sensor data of a performed substrate processing operation. System 300 may be used in conjunction with models that generate predictive data based on virtual substrate processing operations. System 300 may be used with a combination of these and other types of models for generating data associated with a target process chamber of manufacturing equipment 124 of FIG. 1. In some embodiments, system 300 may be used in conjunction with a model to determine a corrective action associated with manufacturing equipment. In some embodiments, system 300 may be used in conjunction with a model to determine a fault of manufacturing equipment. In some embodiments, system 300 may be used in conjunction with a model to cluster or classify substrates. System 300 may be used in conjunction with a model with a different function than those listed, associated with a manufacturing system.

At block 310, system 300 (e.g., components of predictive system 110 of FIG. 1) may perform data partitioning (e.g., via data set generator 172 of server machine 170 of FIG. 1) of data to be used in training, validating, and/or testing a machine learning model. At block 310, system 300 may perform data partitioning of data to be used in calibrating a physics-based model. At block 310, system 300 may perform data partitioning of data to be used in configuring another type of model. Configuring data 364 may include any data to be used in configuring (e.g., training, calibrating, etc.) a model for use by a comprehensive modeling platform. In some embodiments, configuring data 364 includes historical data, such as historical metrology data, historical design data, historical classification data (e.g., classification of whether a product meets performance thresholds), historical microscopy image data, etc. Configuring data 364 may undergo data partitioning at block 310 to generate training set 302, validation set 304, and testing set 306. For example, the training set may be 60% of the training data, the validation set may be 20% of the training data, and the testing set may be 20% of the training data. In some embodiments, fewer types of sets may be generated. For example, model validation may not be performed for some models, mode testing may not be performed for some models, etc. Training set 302 may be used as a calibration set for a physics-based model or another type of model configuration set.

The generation of training set 302, validation set 304, and testing set 306 may be tailored for a particular application. For example, the training set may be 60% of the training data, the validation set may be 20% of the training data, and the testing set may be 20% of the training data. System 300 may generate a plurality of sets of features for each of the training set, the validation set, and the testing set. For example, if configuring data 364 includes sensor data, including features derived from sensor data from 20 sensors (e.g., sensors 126 of FIG. 1) and 10 manufacturing parameters (e.g., manufacturing parameters that correspond to the same processing runs(s) as the sensor data from the 20 sensors), the sensor data may be divided into a first set of features including sensors 1-10 and a second set of features including sensors 11-20. The manufacturing parameters may also be divided into sets, for instance a first set of manufacturing parameters including parameters 1-5, and a second set of manufacturing parameters including parameters 6-10. Either target input, target output, both, or neither may be divided into sets. Multiple models may be trained on different sets of data.

At block 312, system 300 performs model training (e.g., via training engine 182 of FIG. 1) using training set 302. Training of a machine learning model and/or of a physics-based model (e.g., a digital twin) may be achieved in a supervised learning manner, which involves providing a training dataset including labeled inputs through the model, observing its outputs, defining an error (by measuring the difference between the outputs and the label values), and using techniques such as deep gradient descent and back-propagation to tune the weights of the model such that the error is minimized. In many applications, repeating this process across the many labeled inputs in the training dataset yields a model that can produce correct output when presented with inputs that are different than the ones present in the training dataset. In some embodiments, training of a machine learning model may be achieved in an unsupervised manner, e.g., labels or classifications may not be supplied during training. An unsupervised model may be configured to perform anomaly detection, result clustering, etc.

For each training data item in the training dataset, the training data item may be input into the model (e.g., into the machine learning model). The model may then process the input training data item (e.g., data values provided by sensors of a manufacturing system, etc.) to generate an output. The output may include, for example, predicted substrate features. The output may be compared to a label of the training data item (e.g., measured features of a substrate corresponding to the input data from metrology equipment). Processing logic may then compare the generated output (e.g., predicted substrate features) to the label (e.g., measured substrate features) that was included in the training data item. Processing logic determines an error (i.e., a classification error) based on the differences between the output and the label(s). Processing logic adjusts one or more weights and/or values of the model based on the error.

In the case of training a neural network, an error term or delta may be determined for each node in the artificial neural network. Based on this error, the artificial neural network adjusts one or more of its parameters for one or more of its nodes (the weights for one or more inputs of a node). Parameters may be updated in a back propagation manner, such that nodes at a highest layer are updated first, followed by nodes at a next layer, and so on. An artificial neural network contains multiple layers of "neurons", where each layer receives as input values from neurons at a previous layer. The parameters for each neuron include weights associated with the values that are received from each of the neurons at a previous layer. Accordingly, adjusting the parameters may include adjusting the weights assigned to each of the inputs for one or more neurons at one or more layers in the artificial neural network.

In the case of training a physics-based model, one or more floating parameters may be included in the model and may be adjusted to fit the calibration data. Floating parameters may be additional terms (e.g., higher-order terms of one or more equations describing physics of the process chamber), may include making adjustments to core terms related to known physics, etc. Physics-based models may include terms and/or parameters related to any physical process of interest, including material properties, thermal properties, electrical properties, fluid dynamic properties, etc., associated with the process chamber. Adjusting the floating parameters may be done such that an error term between the generated output of the physics-based model and expected output based on the configuring data 364 is reduced or minimized. Determining a number of terms to include in a physics-based model may include consideration of accuracy, run time, overfitting (e.g., number of floating parameters compared to amount of calibration data available), etc.

System 300 may train multiple models using multiple sets of features of the training set 302 (e.g., a first set of features of the training set 302, a second set of features of the training set 302, etc.). For example, system 300 may train a model to generate a first trained model using the first set of features in the training set (e.g., sensor data from sensors 1-10, metrology measurements 1-10, etc.) and to generate a second trained model using the second set of features in the training set (e.g., sensor data from sensors 11-20, metrology measurements 11-20, etc.). In some embodiments, the first trained model and the second trained model may be combined to generate a third trained model (e.g., which may be a better predictor or synthetic data generator than the first or the second trained model on its own). In some embodiments, sets of features used in comparing models may overlap (e.g., first set of features being sensor data from sensors 1-15 and second set of features being sensors 5-20). In some embodiments, hundreds of models may be generated including models with various permutations of features and combinations of models.

At block 314, system 300 performs model validation (e.g., via validation engine 184 of FIG. 1) using the validation set 304. The system 300 may validate each of the trained models using a corresponding set of features of the validation set 304. For example, system 300 may validate the first trained model using the first set of features in the validation set (e.g., sensor data from sensors 1-10 or metrology measurements 1-10) and the second trained model using the second set of features in the validation set (e.g., sensor data from sensors 11-20 or metrology measurements 11-20). In some embodiments, system 300 may validate hundreds of models (e.g., models with various permutations of features, combinations of models, etc.) generated at block 312. At block 314, system 300 may determine an accuracy of each of the one or more trained models (e.g., via model validation) and may determine whether one or more of the trained models has an accuracy that meets a threshold accuracy. Responsive to determining that none of the trained models has an accuracy that meets a threshold accuracy, flow returns to block 312 where the system 300 performs model training using different sets of features of the training set. Responsive to determining that one or more of the trained models has an accuracy that meets a threshold accuracy, flow continues to block 316. System 300 may discard the trained models that have an accuracy that is below the threshold accuracy (e.g., based on the validation set).

At block 316, system 300 performs model selection (e.g., via selection engine 185 of FIG. 1) to determine which of the one or more trained models that meet the threshold accuracy has the highest accuracy (e.g., the selected model 308, based on the validating of block 314). Responsive to determining that two or more of the trained models that meet the threshold accuracy have the same accuracy, flow may return to block 312 where the system 300 performs model training using further refined training sets corresponding to further refined sets of features for determining a trained model that has the highest accuracy.

At block 318, system 300 performs model testing (e.g., via testing engine 186 of FIG. 1) using testing set 306 to test selected model 308. System 300 may test, using the first set of features in the testing set (e.g., sensor data from sensors 1-10), the first trained model to determine the first trained model meets a threshold accuracy. Determining whether the first trained model meets a threshold accuracy may be based on the first set of features of testing set 306. Responsive to accuracy of the selected model 308 not meeting the threshold accuracy, flow continues to block 312 where system 300 performs model training (e.g., retraining) using different training sets corresponding to different sets of features. Accuracy of selected model 308 may not meet threshold accuracy if selected model 308 is overly fit to the training set 302 and/or validation set 304. Accuracy of selected model 308 may not meet threshold accuracy if selected model 308 is not applicable to other data sets, including testing set 306. Training using different features may include training using data from different sensors, different manufacturing parameters, etc. Responsive to determining that selected model 308 has an accuracy that meets a threshold accuracy based on testing set 306, flow continues to block 320. In at least block 312, the model may learn patterns in the training data to make predictions. In block 318, the system 300 may apply the model on the remaining data (e.g., testing set 306) to test the predictions.

At block 320, system 300 uses the trained model (e.g., selected model 308) to receive current data 322 and determines (e.g., extracts), from the output of the trained model, predictive data 324. Current data 322 may be manufacturing parameters related to a process, operation, or action of interest. Current data 322 may be manufacturing parameters related to a process under development, redevelopment, investigation, etc. Current data 322 may be manufacturing parameters related to a gas transport system. Current data 322 may be manufacturing parameters that may have an effect on delay of changes to condition values compared to initiation of condition-altering actions. Current data 322 may be manufacturing parameters related to gas delivery and/or gas removal in association with a substrate processing chamber. A corrective action associated with the manufacturing equipment 124 of FIG. 1 may be performed in view of predictive data 324. In some embodiments, current data 322 may correspond to the same types of features in the historical data used to train the model. In some embodiments, current data 322 corresponds to a subset of the types of features in historical data that are used to train selected model 308. For example, a machine learning model may be trained using a number of manufacturing parameters, and configured to generate output based on a subset of the manufacturing parameters.

In some embodiments, the performance of a model trained, validated, and tested by system 300 may deteriorate. For example, a manufacturing system associated with the trained machine learning model may undergo a gradual change or a sudden change. A change in the manufacturing system may result in decreased performance of the trained machine learning model. A new model may be generated to replace the machine learning model with decreased performance. The new model may be generated by altering the old model by retraining, by generating a new model, etc. For example, performance of the model may deteriorate due to a change in a coating on interior walls of the process chamber, deterioration of one or more components (e.g., quarts or silicon carbide components) of the chamber, aging or failing of one or more components of the chamber (e.g., aging of a lamp, arcing of a heater, etc.), or another change affecting performance of the chamber.

Generation of a new model may include providing additional configuring data 346. Generation of a new model may further include providing current data 322, e.g., data that has been used by the model to make predictions. In some embodiments, current data 322 when provided for generation of a new model may be labeled with an indication of an accuracy of predictions generated by the model based on current data 322. Additional training data 346 may be provided to model training at block 312 for generation of one or more new models, updating, retraining, and/or refining of selected model 308, etc.

Generation of a new model (e.g., updating of parameters of a trained model) may be performed for any model associated with a manufacturing chamber, e.g., any digital twin model replicating properties of the manufacturing chamber. Generation of a new model may be performed for a physics-based digital twin model, a data-based (e.g., machine learning) digital twin model, a hybrid model (e.g., including features of a data-based and physics-based), etc. Generation of a new model may be performed for a model that receives chamber sensor data, a model that receives manufacturing parameters, a model that receives simulation inputs (e.g., for generating a virtual substrate), etc.

In some embodiments, one or more of the acts 310-320 may occur in various orders and/or with other acts not presented and described herein. In some embodiments, one or more of acts 310-320 may not be performed. For example, in some embodiments, one or more of data partitioning of block 310, model validation of block 314, model selection of block 316, or model testing of block 318 may not be performed.

FIG. 3 depicts a system that may be utilized for configuring, training, validating, testing, and using one or more machine learning models. The machine learning models are configured to accept data as input (e.g., set points provided to manufacturing equipment, sensor data, metrology data, etc.) and provide data as output (e.g., predictive data, corrective action data, classification data, etc.). Partitioning, training, validating, selection, testing, and using blocks of system 300 may be executed similarly to train a second model, utilizing different types of data. Retraining may also be performed, utilizing current data 322 and/or additional training data 346. System 300 may further be utilized for configuring, calibrating, etc., one or more physics-based models, statistical models, rule-based models, heuristic models, etc.

FIGS. 4A-D are flow diagrams of methods 400A-D associated with training and utilizing a comprehensive modeling platform, according to certain embodiments. Methods 400A-D may be performed by processing logic that may include hardware (e.g., circuitry, dedicated logic, programmable logic, microcode, processing device, etc.), software (such as instructions run on a processing device, a general purpose computer system, or a dedicated machine), firmware, microcode, or a combination thereof. In some embodiment, methods 400A-D may be performed, in part, by predictive system 110. Method 400A may be performed, in part, by predictive system 110 (e.g., server machine 170 and data set generator 172 of FIG. 1, data set generators 272A-B of FIGS. 2A-B). Predictive system 110 may use method 400A to generate a data set to at least one of train, validate, or test a machine learning model, in accordance with embodiments of the disclosure. Predictive system 110 may use method 400A to generate a data set to calibrate a physics-based model. Predictive system 110 may use method 400A to generate a data set to configure another type of model for use by a comprehensive modeling platform in association with a process chamber. Methods 400B-D may be performed by predictive server 112 (e.g., predictive component 114), client device 120, and/or server machine 180 (e.g., training, validating, and testing operations may be performed by server machine 180). In some embodiments, a non-transitory machine-readable storage medium stores instructions that when executed by a processing device (e.g., of predictive system 110, of server machine 180, of predictive server 112, etc.) cause the processing device to perform one or more of methods 400A-C.

For simplicity of explanation, methods 400A-D are depicted and described as a series of operations. However, operations in accordance with this disclosure can occur in various orders and/or concurrently and with other operations not presented and described herein. Furthermore, not all illustrated operations may be performed to implement methods 400A-D in accordance with the disclosed subject matter. In addition, those skilled in the art will understand and appreciate that methods 400A-D could alternatively be represented as a series of interrelated states via a state diagram or events.

Figure 4A:
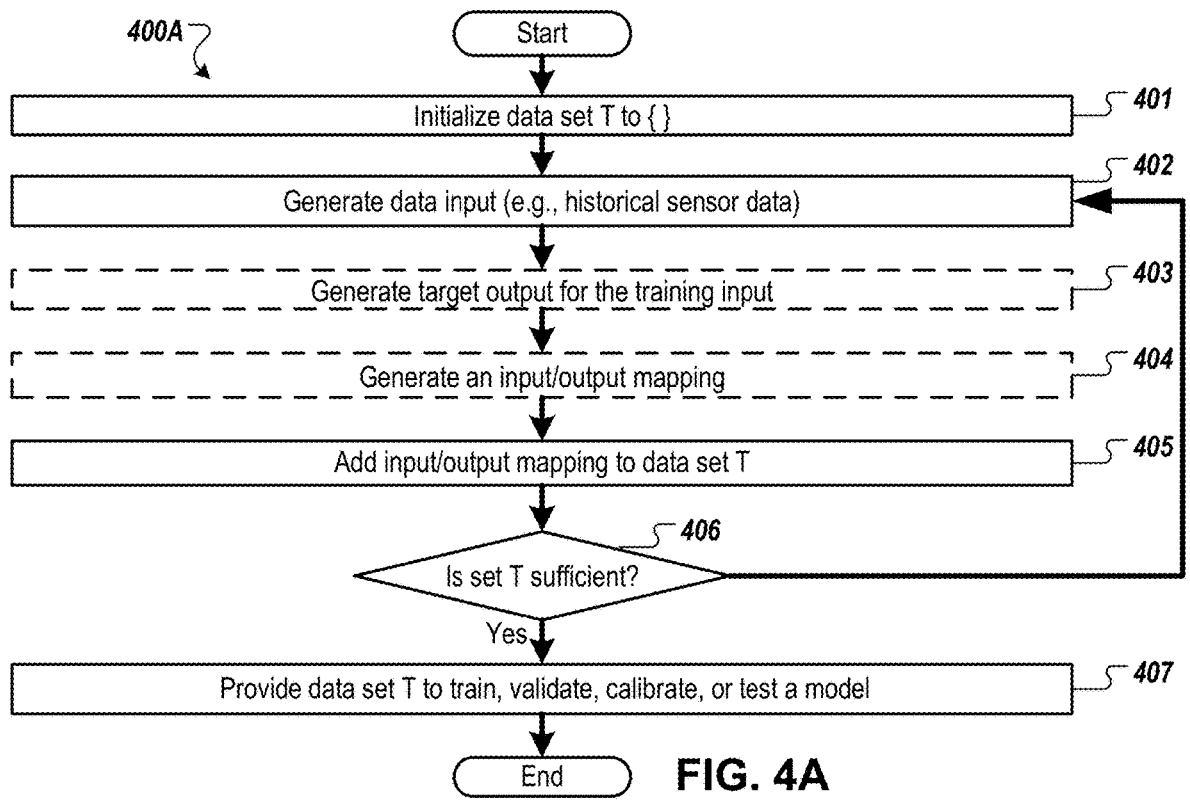
FIG. 4A is a flow diagram of a method for generating a data set for a model, according to some embodiments.

FIG. 4A is a flow diagram of a method 400A for generating a data set for a model, according to some embodiments. The data set may be utilized in training, validating, or testing a model. The data set may be generated for a machine learning model. The data set may be generated for calibrating a physics-based model. The data set may be for generating a digital twin model of a process chamber. The data set may be utilized for configuring another type of model in association with a process chamber. Referring to FIG. 4A, in some embodiments, at block 401 the processing logic implementing method 400A initializes a training set T to an empty set.

At block 402, processing logic generates first data input (e.g., first training input, first validating input) that may include one or more of sensor, manufacturing parameters, metrology data, etc. In some embodiments, the first data input may include a first set of features for types of data and a second data input may include a second set of features for types of data (e.g., as described with respect to FIG. 3). Input data may include historical data.

In some embodiments, at block 403, processing logic optionally generates a first target output for one or more of the data inputs (e.g., first data input). In some embodiments, the input includes one or more sensor data points and the target output includes substrate feature data. In some embodiments, the first target output is predictive data. In some embodiments, input data may be in the form of sensor data and target output may be a list of components likely to be faulty, as in the case of a machine learning model configured to identify failing manufacturing systems. In some embodiments, no target output is generated (e.g., an unsupervised machine learning model capable of grouping or finding correlations in input data, rather than requiring target output to be provided).

At block 404, processing logic optionally generates mapping data that is indicative of an input/output mapping. The input/output mapping (or mapping data) may refer to the data input (e.g., one or more of the data inputs described herein), the target output for the data input, and an association between the data input(s) and the target output. In some embodiments, such as in association with machine learning models where no target output is provided, block 404 may not be executed.

At block 405, processing logic adds the mapping data generated at block 404 to data set T, in some embodiments.

At block 406, processing logic branches based on whether data set T is sufficient for at least one of training, validating, and/or testing a machine learning model, calibrating a physics-based model, configuring another type of model, or the like. If so, execution proceeds to block 407, otherwise, execution continues back at block 402. It should be noted that in some embodiments, the sufficiency of data set T may be determined based simply on the number of inputs, mapped in some embodiments to outputs, in the data set, while in some other embodiments, the sufficiency of data set T may be determined based on one or more other criteria (e.g., a measure of diversity of the data examples, accuracy, etc.) in addition to, or instead of, the number of inputs.

At block 407, processing logic provides data set T (e.g., to server machine 180) to train, validate, calibrate and/or test model 190. Model 190 may be a machine learning model. Model 190 may be a physics-based model. In some embodiments, data set T is a training set and is provided to training engine 182 of server machine 180 to perform the training. In some embodiments, data set T is a validation set and is provided to validation engine 184 of server machine 180 to perform the validating. In some embodiments, data set T is a testing set and is provided to testing engine 186 of server machine 180 to perform the testing. In the case of a neural network, for example, input values of a given input/output mapping (e.g., numerical values associated with data inputs 210A) are input to the neural network, and output values (e.g., numerical values associated with target outputs 220A) of the input/output mapping are stored in the output nodes of the neural network. The connection weights in the neural network are then adjusted in accordance with a learning algorithm (e.g., back propagation, etc.), and the procedure is repeated for the other input/output mappings in data set T. After block 407, a model (e.g., model 190) can be at least one of trained using training engine 182 of server machine 180, validated using validating engine 184 of server machine 180, or tested using testing engine 186 of server machine 180. The trained model may be implemented by predictive component 114 (of predictive server 112) to generate predictive data 168 for performing signal processing, to generate synthetic data 162, or for performing a corrective action associated with manufacturing equipment 124.

Figure 4B:
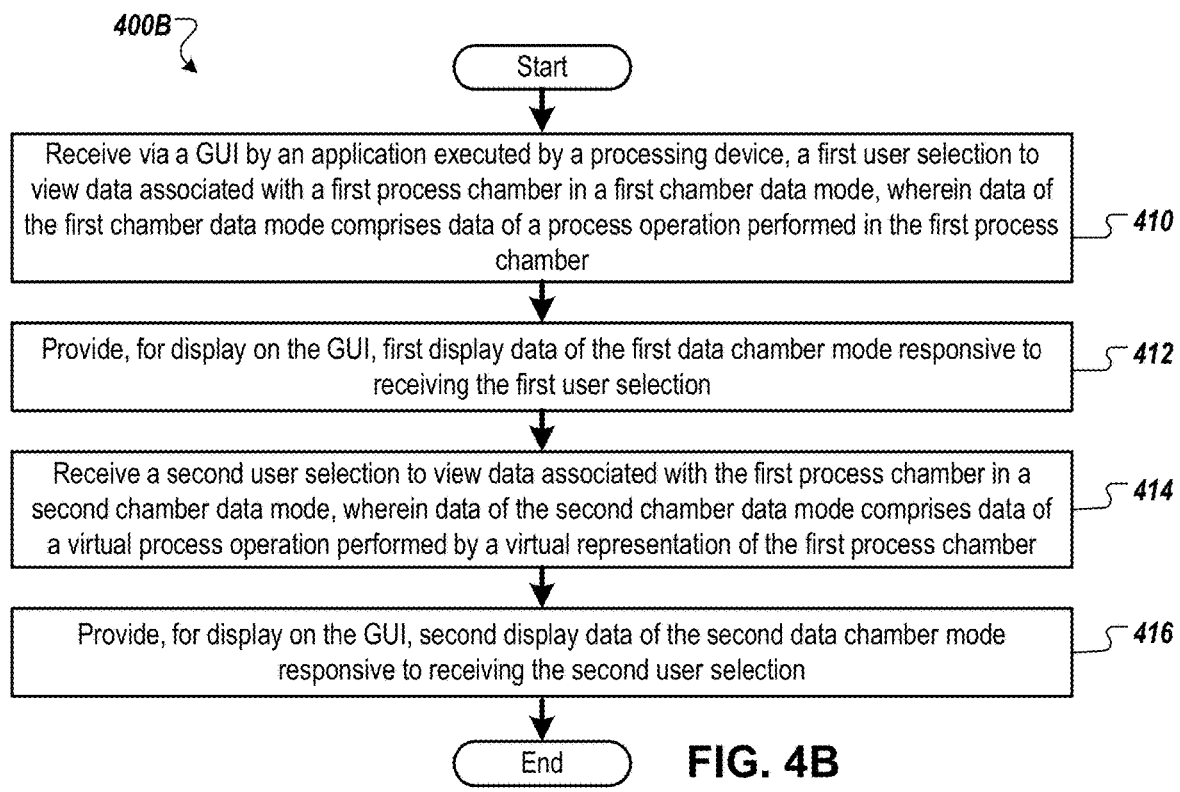
FIG. 4B is a flow diagram of a method for utilizing a comprehensive modeling platform for data analysis in association with a process chamber, according to some embodiments.

FIG. 4B is a flow diagram of a method 400B for utilizing a comprehensive modeling platform for data analysis in association with a process chamber, according to some embodiments. At block 410, processing logic receives, via a GUI, a first user selection to view data associated with a first process chamber in a first chamber data mode (e.g., modeling data mode). Alternatively, processing logic may receive a prompt (e.g., a text or voice prompt) indicating data to view with respect to the first process chamber in the first chamber data mode. The prompt may be processed using a LLM, and the LLM may output instructions to make the selection to view the data associated with the first process chamber. The GUI and/or LLM may be executed as part of an application, e.g., a comprehensive modeling platform. The first chamber data mode includes data of a process operations performed in the first process chamber. In some embodiments, input may be received in another way, e.g., via a different type of user interface, including a text interface, virtual reality interface, augmented reality interface, or the like.

The data viewed may be output data of one or more models associated with the first process chamber. The data viewed may be output data of one or more calibrated physics-based models, trained machine learning models, or other types of models. The output data may be of one or more digital twin models of the first process chamber.

Generating the data may include providing input to a model and receiving output from the model. The first chamber data mode may include providing data associated with a process operation performed in the first process chamber to one or more models. The input to the models may include sensor data from the first process chamber. Sensor data may include sensors that enable accurate operation of one or more components of the process chamber, such as sensors that provide feedback on actuator positions, electrical power provided to components, or the like. Sensor data may include sensors that report on conditions in the process chamber, such as temperature sensors, pressure sensors, etc.

Providing data to a model, executing the model, etc., may be performed upon a user request as provided via the application, e.g., the comprehensive modeling platform. A user may select a process recipe or process operation performed in the first process chamber, and a selection of one or more models may be executed upon user selection. In some embodiments, a user may select a particular category of data, and associated models may be executed upon user selection. In some embodiments, a user may select a particular model for execution. A user may select a group of models to be executed, e.g., to generate a selection of data for use in related analysis applications.

At block 412 processing logic provides, for display on the GUI, first display data of the first data chamber mode (e.g., modeling data mode) responsive to receiving the first user selection. Displaying the first data may include generating one or more tables, graphics, or other visualizations of the data. Displaying the first display data may include generating graphs, plots, charts, etc., of the first display data. The first display data may be virtual sensor data, based on output of one or more models, one or more digital twins, or the like. The first display data may be virtual sensor data, based on output of one or more data-based models, one or more machine learning models, or the like.

At block 414, processing logic receives a second user selection to view data associated with the first process chamber in a second chamber data mode. The user selection may be received via the GUI. Alternatively, processing logic may receive a prompt (e.g., a text or voice prompt) indicating data to view with respect to the first process chamber in the second chamber data mode. The prompt may be processed using a LLM, and the LLM may output instructions to make the selection to view the data associated with the first process chamber. The second chamber data mode includes data of a virtual process operation performed by a virtual representation of the first process chamber. The second chamber data mode may include data generated by a digital twin model of a process chamber. The second chamber data mode may include data associated with a virtual process chamber, virtual process operation, virtual substrate, or the like.

The second chamber data mode may include generating virtual substrate data (e.g., data associated with a virtual substrate generation process). The virtual substrate data may be generated by providing input data to one or more models, e.g., physics-based models, machine learning models, or the like. The virtual substrate data may be generated by providing simulation inputs to one or more models. Input may be provided to one or more models upon user selection of the second chamber data mode, selection of the process chamber for data analysis, selection of one or more data analysis or generation techniques, or the like. The second display data may be indicative of quality of performance of the virtual process operation, e.g., whether or not the virtual process operations meets one or more threshold performance conditions.

At block 416, processing logic provides, for display on the GUI, second display data of the second data chamber mode responsive to receiving the second user selection. Displaying the second display data may share one or more features with operations described in connection with displaying the first display data.

Figure 4C:
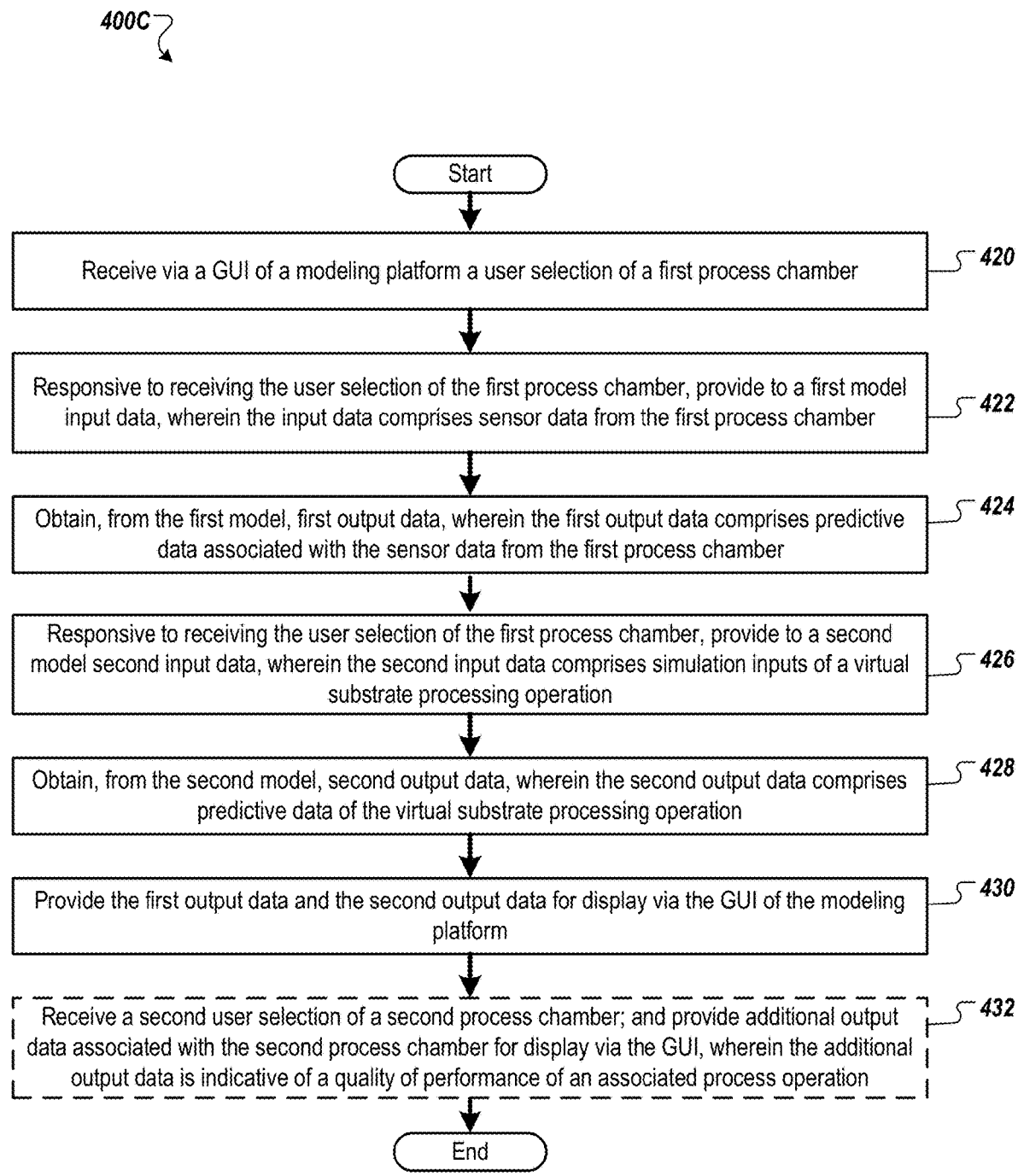
FIG. 4C is a flow diagram of a method for utilizing models using a comprehensive modeling platform, according to some embodiments.

FIG. 4C is a flow diagram of a method 400C for utilizing models using a comprehensive modeling platform, according to some embodiments. At block 420, processing logic receives a user selection or other input of a first process chamber, via a GUI of a modeling platform. Alternatively, processing logic may receive a prompt (e.g., a text or voice prompt) indicating the first process chamber. The prompt may be processed using a LLM, and the LLM may output instructions to make the selection of the first process chamber.

At block 422, processing logic provides first input data to a first model responsive to receiving the user selection or other input of the first process chamber. The input data includes sensor data from the first process chamber. In some embodiments, the input data may include manufacturing parameters associated with the first process chamber, such as recipe setpoints. In some embodiments, input data may include design features, such as target properties of a substrate. In some embodiments, providing the first input data may be performed based on further selections of the user. For example, providing the first input data may further be performed based on user selection of a manufacturing facility, a manufacturing tool, a data mode (e.g., a monitor mode or explore mode), a target data type, a target model or model category, or the like. The first model may be a trained machine learning model, a calibrated physics-based model, or another type of model. In some embodiments, data provided to a model may include data output by another model, such as providing virtual sensor data based on chamber sensor data as input to the first model. For example output from a plasma prediction model may generate output including ion densities, and the ion density predictions may be provided to a feature model to generate predictions of a pattern generated on a substrate.

At block 424, processing logic obtains, from the first model, first output data. The first output data includes predictive data associated with the sensor data from the first process chamber. The first output data may include virtual sensor data. The first output data may provide more detailed information than available from physical sensors of the first process chamber. The first output data may include feature data of the substrate, processing conditions, substrate conditions, etc.

At block 426, processing logic provides to a second model second input data. The second input data is provided responsive to receiving the user selection or other input of the first process chamber, and may further be provided based on additional user selections, as described in connection with block 422. The second input data includes simulation inputs of a virtual substrate processing operation. The simulation inputs may correspond to manufacturing parameters. The simulation inputs may correspond to process recipe parameters. The second model may be a digital twin of the first process chamber.

At block 428, processing logic obtains, from the second model, second output data. The second output data includes predictive data of the virtual substrate processing operation. The second data may include feature data of the virtual substrate. The second data may include process conditions of the virtual processing conditions. The second data may include condition data of the virtual substrate during processing.

At block 430, processing logic provides the first output data and the second output data for display via the GUI of the modeling platform.

At block 432, processing logic optionally receives a second user input (e.g., user selection via interaction with the GUI or a voice or text prompt) with respect to selection of a second process chamber. Various operations may be performed in connection with the second user selection. A third trained machine learning model corresponding to the first trained machine learning model (e.g., configured to generate predictions of the same properties of a substrate processing operation) and the second process chamber may be provided input data. A fourth trained machine learning model corresponding to the second trained machine learning model and the second process chamber may be provided input data. Additional models may be provided with input data. The additional models may be part of number of data modeling modes (e.g., explore and monitor modes). The additional models may be machine learning models, physics-based models, or other types of models. The additional models may be or include digital twin models of the second process chamber. Additional output associated with the second process chamber may be provided for display by the GUI. The data displayed by the GUI may be indicative of a quality of performance of an associated process operation (e.g., a physical substrate processing operations, a virtual substrate processing operation).

Figure 4D:
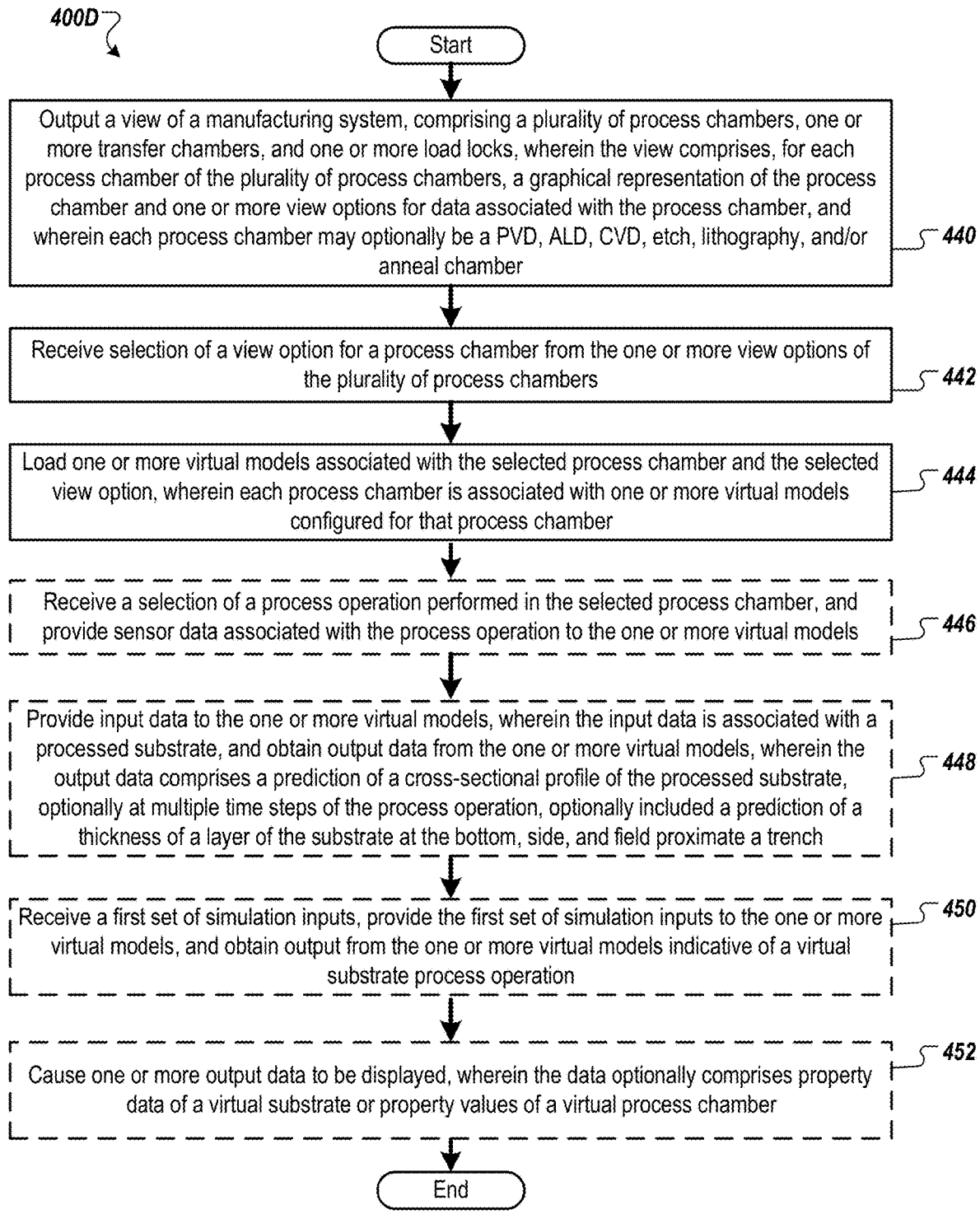
FIG. 4D is a flow diagram of a method for operation of a comprehensive modeling platform, according to some embodiments.

FIG. 4D is a flow diagram of a method 400D for operation of a comprehensive modeling platform, according to some embodiments. At block 440, processing logic outputs a view of a manufacturing system, e.g., via a display of a computing device. The manufacturing system includes a plurality of process chambers, one or more transfer chambers, and one or more load locks. The view includes a graphical representation of each process chamber of the plurality of process chambers and one or more view options for data associated with the process chamber. The view may further include a labeling of the process chambers, which may include names, identification information, chamber types, etc. The chamber types may include physical vapor deposition (PVD) chambers, chemical vapor deposition (CVD) chambers, atomic layer deposition (ALD) chambers, etch chambers, lithography chambers, anneal chambers, etc.

At block 442, processing logic receives an input associated with selection of a view option for a process chamber from the one or more view options of the plurality of process chambers. The view options may, for example, include a monitor and explore data view modes for each of the process chambers of the manufacturing system.

At block 444, processing logic loads one or more virtual models associated with the selected process chamber and the selected view option. Each process chamber is associated with one or more virtual models configured for that process chamber. The models may include data-based models (e.g., trained machine learning models). The data-based models may be trained based on training data from the associated process chamber. The models may include physics-based models. The physics-based models may be calibrated based on calibration data from the associated process chamber.

At block 446, processing logic optionally receives an input associated with selection of a process operation performed in the selected process chamber, and provides sensor data associated with the process operation to the one or more virtual models.

At block 448, processing logic optionally provides input data to the one or more virtual models. The input data may be associated with a processed substrate (e.g., a processed substrate processed in the selected process chamber). Processing logic may further obtain output data from the one or more virtual models. The output data may include a prediction of properties of the processed substrate. The output data may include a prediction of thickness of one or more layers of the processed substrate, e.g., thickness of a material deposited on the processed substrate in a target process operation. The output data may include a prediction of thickness across a portion of the substrate. The output data may include a prediction of one or more properties of one or more layers of the substrate in one or more cross-sectional slices of the substrate. The output data may include one or more cross-sectional profiles of the substrate. The output data may include prediction of properties (e.g., film thickness, film profile, etc.) at the bottom region of a trench of the substrate, sidewalls of the trench of the substrate, a field proximate the trench of the substrate, etc. In some embodiments, multiple predictions may be made corresponding to various times as a process operation (e.g., film deposition) continues. For example, a prediction of the growth of a film through a deposition operation may be generated.

At block 450, processing logic optionally receives a first set of simulation inputs. Processing logic further provides the first set of simulation inputs to the one or more virtual models. The processing logic further obtains output from the one or more virtual models indicative of a virtual substrate process operation.

At block 452, processing logic optionally causes one or more output data to be displayed, e.g., via a GUI. The data displayed optionally includes property data of a virtual substrate or property values of a virtual process chamber. The data displayed optionally includes predicted property data of a physical substrate or predicted property values of a virtual process chamber.

Figure 5A:
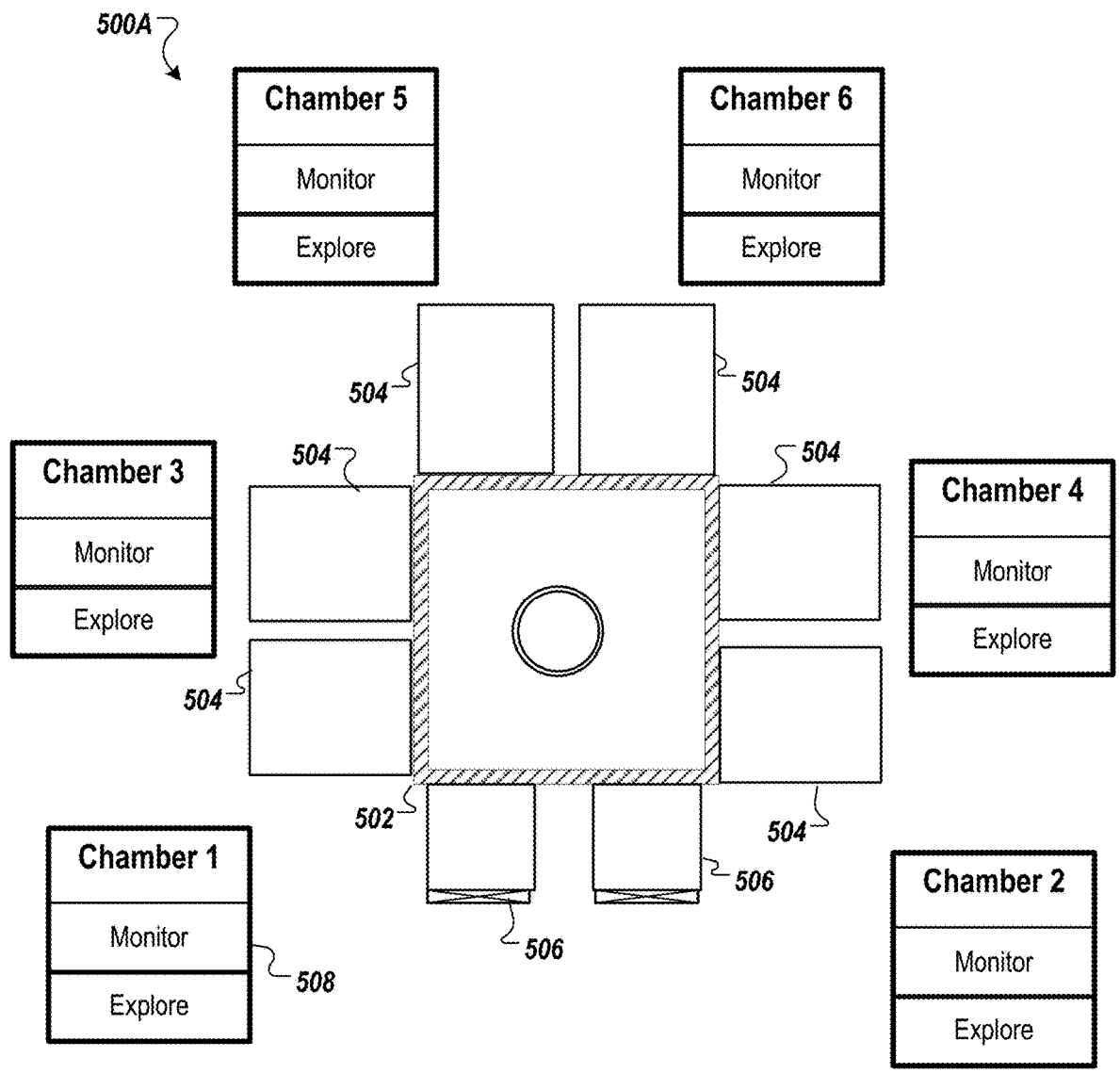
FIG. 5A is a view of a GUI for selection of a process chamber for a comprehensive modeling platform, according to some embodiments.

FIG. 5A is a view of a GUI 500A for selection of a process chamber for a comprehensive modeling platform, according to some embodiments. GUI 500A includes a graphical depiction of a tool 502. In some embodiments, operations of GUI 500A may be performed in a list format, icon format, or another format. Tool 502 may have been previously selected, e.g., via previous views of the GUI. Tool 502 may be long to a group of tools, e.g., a manufacturing facility, previously selected by a user.

Tool 502 includes process chambers 504. Process chambers 504 may be of various types, models, configurations, etc. Process chambers 504 may be of the same type, model, or configuration. Tool 502 further includes load lock chambers 506. In some embodiments, some chambers of tool 502 may have associated models, while other chambers of tool 502 may not have associated models. For example, process chambers 504 may each have one or more associated models, and load lock chambers 506 may not have associated models.

Chambers may include associated selection user interface (UI) elements 508. Selection elements 508 may enable a user to further select data of a chamber to view, models of a chamber to execute, model data of a chamber to view, etc. In some embodiments, selection elements 508 may provide one or more options to a user. For example, a first option may include models based on data provided by sensors on a physical process tool corresponding to the digital representation tool 502 (e.g., a monitor option). A second option may include models based on a digital representation of the process chamber (e.g., an explore option).

One or more chambers may include options to access categories of models. Various selection elements 508 may include the same or different options, in accordance with available models, needs or preferences of a user, chamber type, category, or quality, or another metric.

In some embodiments, operations of a first user selection or other input for viewing chamber data includes data derived from models utilizing chamber sensor data as input. For example, chamber sensor data may be provided to a model, and one or more virtual sensors may report on conditions that are not monitored by a physical sensor, but are of interest to a user. The models may be physics-based, digital twin models, data-based models, machine learning models, statistical models, or another type of model. Models may predict conditions of a processing chamber. Models may predict metrology of a substrate. Models may predict evolution of a condition over time, e.g., models may predict evolution of a substrate metrology metric over the course of a processing operation. Models may predict conditions at various time intervals during processing. Models may be further divided into groups, such as models based on various physical phenomena (e.g., magnetic field models, heat transfer models, gas conduction models, etc.), models directed toward predicting various attributes (e.g., substrate feature modeling, process chamber condition modeling, etc.) or other various groups. The groups of models may be presented via another view of the GUI, e.g., upon selection by a user of a chamber or a data view mode (e.g., monitor or explore modes). In some embodiments, sensor and/or metrology data may also be displayed, in addition to model data based on chamber sensor data.

Operations of a second user selection for viewing chamber data may include data derived from models utilizing virtual processing operations. Such models may mimic operations of the corresponding physical chamber digitally. For example, process inputs may be provided to the models, and predictions of results of providing such process inputs to the chamber may be predicted by the models. In some embodiments, models may be executed upon user request. For example, a machine learning model may be configured to receive simulation inputs (which may or may not mirror process inputs), and output metrology predictions. The model may be executed upon user request, based on user-selected simulation inputs.

Models based on virtual processing operations may be digital twin models of the associated chamber (e.g., the model may mimic operations of the physical chamber). Utilizing a digital twin of a chamber may enable rapid adjustments to recipes, the running of many trial recipes, experimentation of the effects of recipe parameters on outputs, etc., by a user. Performing the same operations on a physical chamber may be prohibitively costly in terms of time, material, disposing of faulty products, time and cost of metrology for the products, etc. Further, a virtual chamber may report on parameters impossible to determine in a physical chamber, such as process conditions in locations inaccessible by sensors, process conditions and/or substrate properties for which sensors cannot be used, time trace data of conditions, substrate features, or other properties that may be inconvenient or impossible to measure, etc. Models based on virtual substrate processing operations may include physics-based models, data-based models, machine learning models, statistical models, etc.

In some embodiments, a set of virtual processing operation models may be operated in various modes (e.g., various modeling data modes). For example, a first mode may be a predictive mode. The predictive mode may receive, as input, inputs related to process inputs. The inputs may be the same as inputs provided to a physical chamber, or related quantities. The predictive mode may then, utilizing one or more models, generate output indicative of process chamber performance quality. The output may include predictions of process conditions, predictions of substrate metrology, predictions of substrate evolution during the process operation, etc. A second mode may be an exploration or recipe design mode. The second mode may receive as input a set of chamber performance quality metrics. For example, the second mode may receive as input one or more target process conditions, one or more target substrate metrology metrics, or the like. Models executed in exploration mode may provide simulation and/or process inputs that are predicted to result in the specified input chamber performance quality metrics being met.

In some embodiments, two chambers 504 of tool 502 may be of the same type, category, model, design, or the like. The two chambers 504 may be nominally identical (e.g., similarly maintained, nominally identical components installed, etc.) or be different by one or more metrics. In some embodiments, separate models may be maintained for the two chambers 504. Separate models may enable accounting for differences between nominally identical chambers, e.g., even within manufacturing tolerances. Separate models may enable updating of various model parameters based on performed maintenance, measured chamber performance, updating of one or more components of the chamber, chamber location (e.g., which port of tool 502 the chamber is coupled to, which facility the chamber is located in), etc. In some embodiments, hardware components may be tracked and/or traced based on hardware setup documentation, hardware configuration information, etc. In some embodiments, a model may be automatically updated and/or verified for applicability by a computing device based on hardware documentation.

In some embodiments, a single chamber may utilize a first component for some operations and a different component for other operations. For example, a chemical vapor deposition chamber may use a first type of substrate holder for some application, some operations, some substrates, when in use by some users, or the like, and a second type of substrate holder for other applications. A model associated with the chamber may be selected to take into account a target configuration of installed components. A user may select installed and/or target components. A user may select one or more models or groups of models targeting the installed components or target components. Processing logic may determine, based on hardware documentation, an appropriate model or models based on installed components in the chamber. Any number of adjustable components may be included in a virtual or physical chamber, and models corresponding to different components of various types, different combinations of components, or the like may be utilized by a comprehensive modeling platform.

Figure 5B:
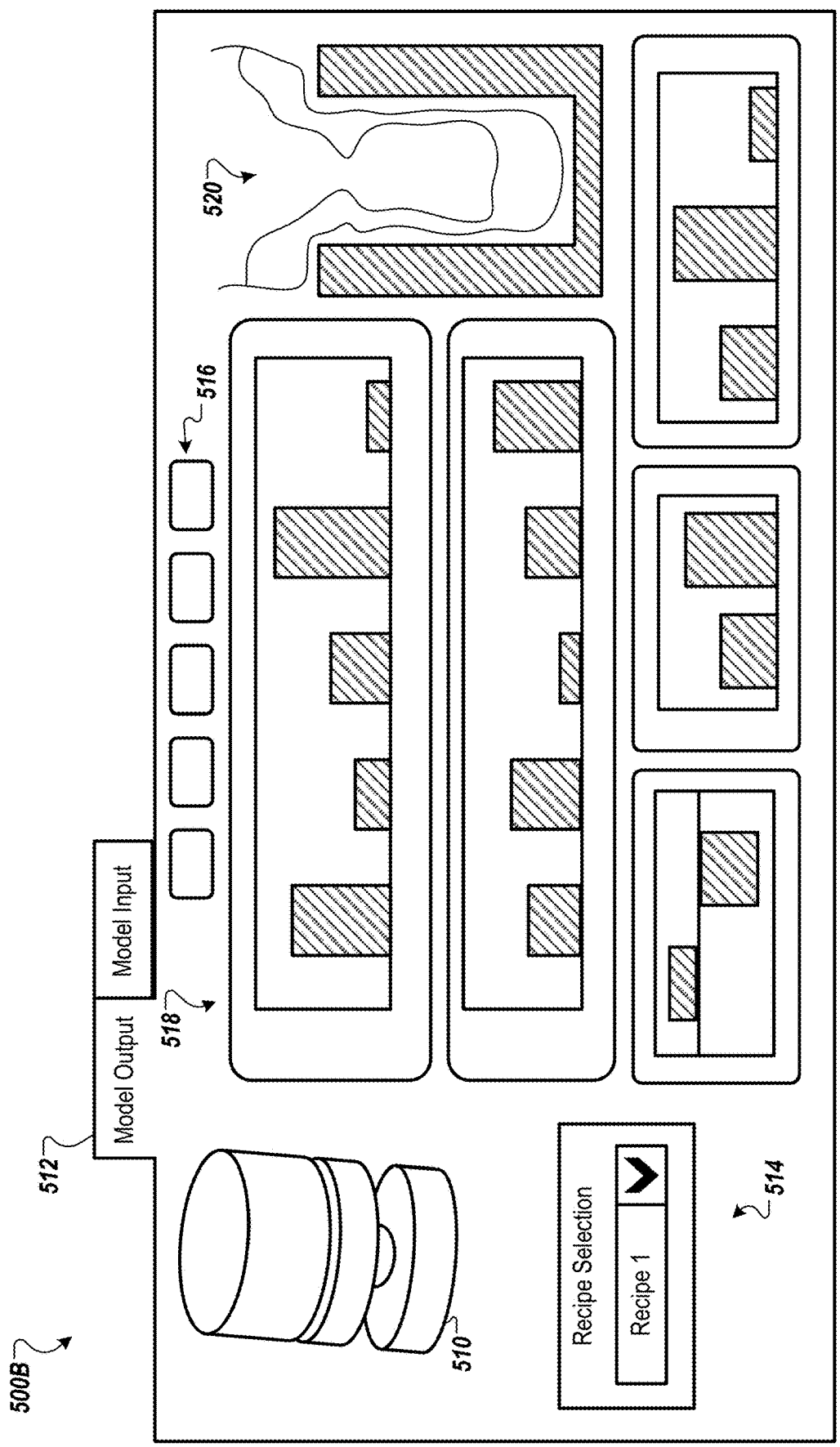
FIG. 5B depicts a view of a GUI of a first mode of a comprehensive modeling platform, according to some embodiments.
Figure 5C:
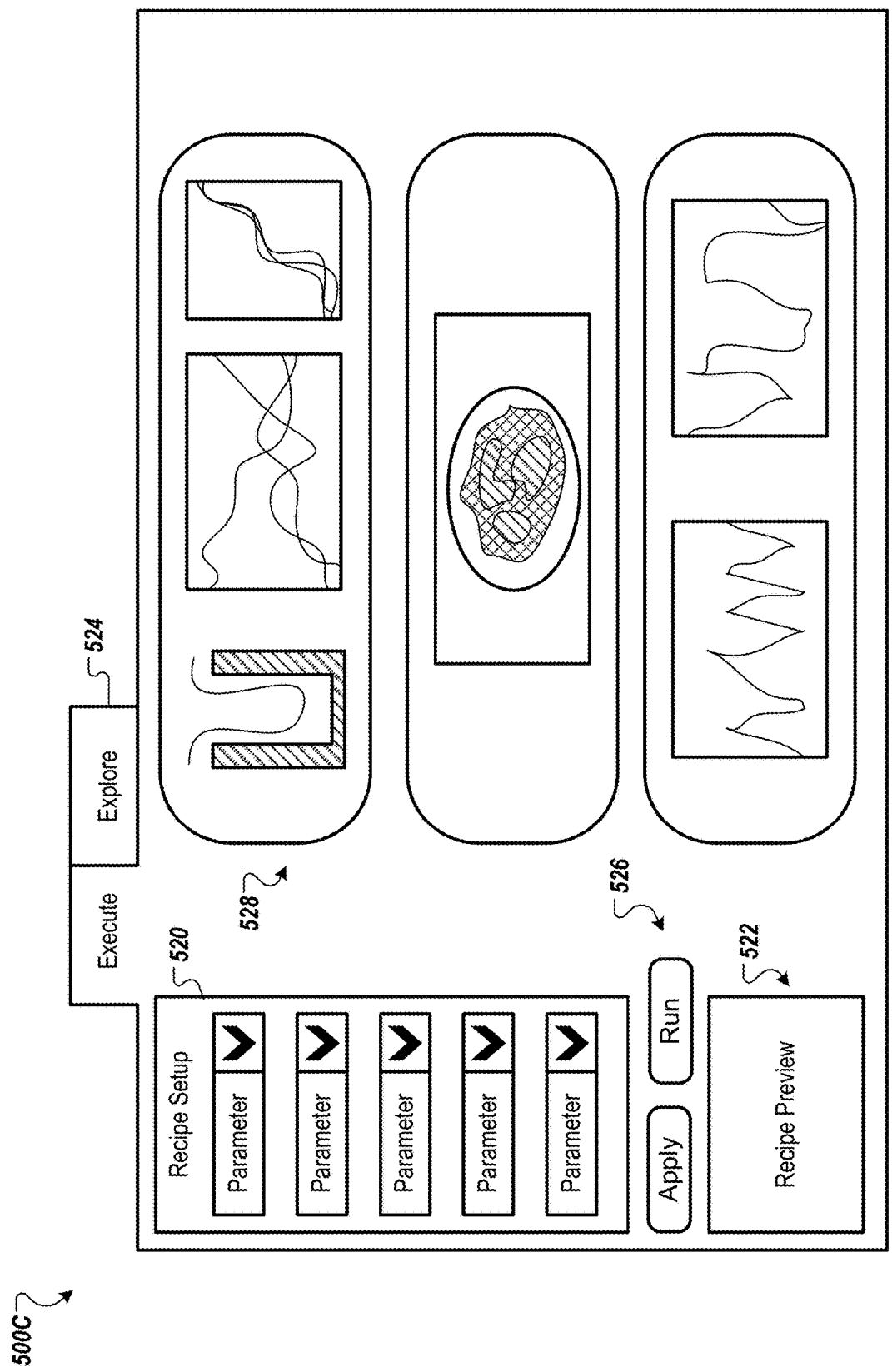
FIG. 5C depicts a view of a GUI of a second mode of a comprehensive modeling platform, according to some embodiments.

Data may be displayed to a user in any convenient way via the GUI. For example, histograms, bar graphs, scatter plots, substrate maps, time traces, or the like may be utilized to display model data to a user. Example data displays are shown in FIGS. 5B-C. In some embodiments, data may be displayed via an augmented reality or virtual reality device, instead of or in addition to a GUI.

FIG. 5B depicts a view of GUI 500B of a first mode (e.g., monitor mode) of a comprehensive modeling platform, according to some embodiments. GUI 500B may be associated with a process chamber of interest, e.g., selected by a user via a selection portion of the comprehensive platform, e.g., as shown in FIG. 5A. Any GUI view may differ from what is shown in this disclosure, with specific data, plots, arrangement of components, inclusion of components, etc., left to customization of the designer of the comprehensive platform, user preference/selection, or the like. Some example elements that may be included in a monitor mode are contained in GUI 500B. Model data of various types, categories, groupings, or the like may be displayed to a user. Further, useful data (e.g., subject to user preferences or selection) may also be displayed. An example of data that may be displayed that is not related to process modeling may include chamber component view 510. Chamber component view 510 may show views of one or more relevant chamber components, may provide tags or labels of various components, may display the effects of chamber conditions on one or more components, etc.

Monitor mode view may include a selection of data view options 512. The data view options shown include model output data and model input data, but various data view options are possible. Model output data (e.g., virtual sensors) include data derived from chamber sensors. Chamber sensors may include sensors disposed to record conditions in the chamber, sensors configured to measure actions taken by chamber components (e.g., actuator position sensors, sensors of electrical power provided to components, etc.), or other types of sensors. Model output data may receive as input sensor data (associated with a previously performed physical process operation) and generate as output one or more metrics of quality of performance of the operation.

Data view options 512 may include model input data. Model input data may include sensor data that is provided to various models associated with the process chamber. For example, sensor data that is used by one or more models to derive substrate metrology may be provided to the user to enable visual checks for anomalies, unexpected values, etc.

GUI 500B may include recipe and recipe view selection element 514. Selection element 514 may be utilized to filter one or more recipes, processing runs, process operations, or the like from the associated process chamber. Selection element 514 may enable a user to compare data associated with various process runs, view changes from one process run to another, view differences between one or more target process runs and a baseline or golden run, etc.

GUI 500B may include model selection 516. Model selection 516 may provide a means for determining which models the comprehensive platform executes, which model data the comprehensive platform displays via GUI 500B, etc. Model selection 516 may separate models into groups or categories, such as substrate feature models, plasma models, substrate temperature models, substrate stress or distortion models, electromagnetic models, plasma generation models, etc. For example, each of the selection boxes shown as part of model selection 516 may correspond to a category of models, and may be include labels (e.g., text labels, illustrative images, etc.), may be selectable to adjust model operation and/or displayed data, etc.

GUI 500B further may include model data display area 518. Model data display area 518 may include one or more elements for displaying different model data associated with one or more process runs performed on the corresponding process chamber. Model data display area 518 may be or include customizable panels, panes, regions, etc. Model data display area 518 may be separated into groups corresponding to groups of model selection 516.

Model data display area 518 may include various types of data display. For example, bar graphs, histograms, scatter plots, time trace plots, substrate dimension prediction images, etc., may be displayed. Model data display area 518 may include data of interest to a user, e.g., customizable by a user to highlight or display target model data. In some embodiments, each display unit of model data display area 518 may correspond to a selection of model selection 516. E.g., the five selected model categories displayed in model selection 516 may correspond to the five data display regions indicated in model data display area 518. In some embodiments, indications may be provided to assist a user in associating data displayed with model selection, e.g., corresponding boxes may be colored, patterned, labeled, or otherwise in a manner to indicate a connection between model selection 516 and model data display area 518.

Various other data, selection options, UI elements, etc., may be included in GUI 500B, such as options related to unit selection, data presentation, etc. For example, a feature shape prediction 520 or other aspects or indications of interest may be included in GUI 500B. One or more of the elements of GUI 500B may be expandable. For example, component view 510 may expand upon user selection for a more detailed view of one or more chamber components, panels of model data display area 518 may expand upon user selection for more detailed or granular presentation of model data, etc.

FIG. 5C depicts a view of GUI 500C for viewing model data in a second mode (e.g., explore mode) of a comprehensive modeling platform, according to some embodiments. GUI 500C may be displayed in response to a user selection of the second mode. GUI 500C may be utilized by a user for viewing modeling data associated with virtual substrate processing chambers, virtual substrate processing operations, virtual substrates, etc. GUI 500C is an example arrangement, and different UI elements may be included, discussed UI elements may not be included, UI elements may be spatially rearranged, etc.

GUI 500C includes recipe setup 520. Recipe setup 520 may include fields a user may utilize for selecting modeling parameters. Recipe setup 520 may include one or more fields for selecting model inputs, for adjusting simulation knobs, for adjusting virtual process knobs, or the like. Fields of recipe setup 520 may include fillable fields, drop-down selection, check boxes, value sliders, or other types of UI element for accepting user specifications. Recipe setup 520 may further include options for model selection, e.g., if multiple sets of models are available for a process chamber. In embodiments, a user may perform recipe setup by interacting with the GUI 500C to input selection or adjustment of model parameters, simulation knobs, model inputs, virtual process knobs, check boxes, value sliders, and so on. In some embodiments, a user may perform recipe setup by providing a prompt as an input. In some embodiments, the prompt is processed by a large language model (LLM) to interpret the prompt and to determine parameters, model inputs, virtual process knobs, etc. to be used for recipe setup. The LLM may be integrated into an application that presents the GUI 500C and/or may interface with the application to provide instructions to the application to perform recipe setup in accordance with the received prompt.

GUI 500C includes operating UI elements 526. Operating UI elements 526 may include a UI element for applying selections of recipe setup 520, a UI element for executing one or more models in accordance with recipe setup 520, or the like. Operating UI elements 526 may cause data to be displayed by GUI 500C. Operating UI elements 526 may cause one or more models to be executed. Operating UI elements 526 may cause a virtual process chamber to perform one or more virtual process operations. Operating UI elements 526 may cause a virtual process chamber to process a virtual substrate in accordance with recipe setup 520.

GUI 500C includes recipe preview 522. Recipe preview 522 may, for example, be used to record the recipe inputs for the last virtual process operation performed. Recipe preview 522 may enable a user to make changes to recipe setup 520 while maintaining an indication of the recipe data associated with the previous virtual substrate, recipe data associated with the other model data displayed by GUI 500C, etc.

GUI 500C may include a further mode selection 524. Mode selection 524 may enable access to different models, different frameworks for models, different data types, or any other selection that may be applicable for the comprehensive modeling platform. FIG. 5C includes a first selection for executing one or more models based on recipe inputs. FIG. 5C also includes a second selection for a user to input one or more desired processing quality metric values (e.g., target substrate metrology, target processing conditions, etc.), and execute one or more models to determine simulation and/or process inputs predicted to generate the desired quality metric values.

GUI 500C further includes model data display area 528. Model data display area 528 may share one or more features with model data display area 518 of FIG. 5B, e.g., various graphs, lists, charts, etc., may be utilized to display data associated with various models executed as part of the comprehensive modeling platform. Model data display area 528 may include detailed data, e.g., wafer property maps, time trace data, etc., as well as summary data, e.g., mean wafer properties, significant condition markers, or the like.

Figure 6:
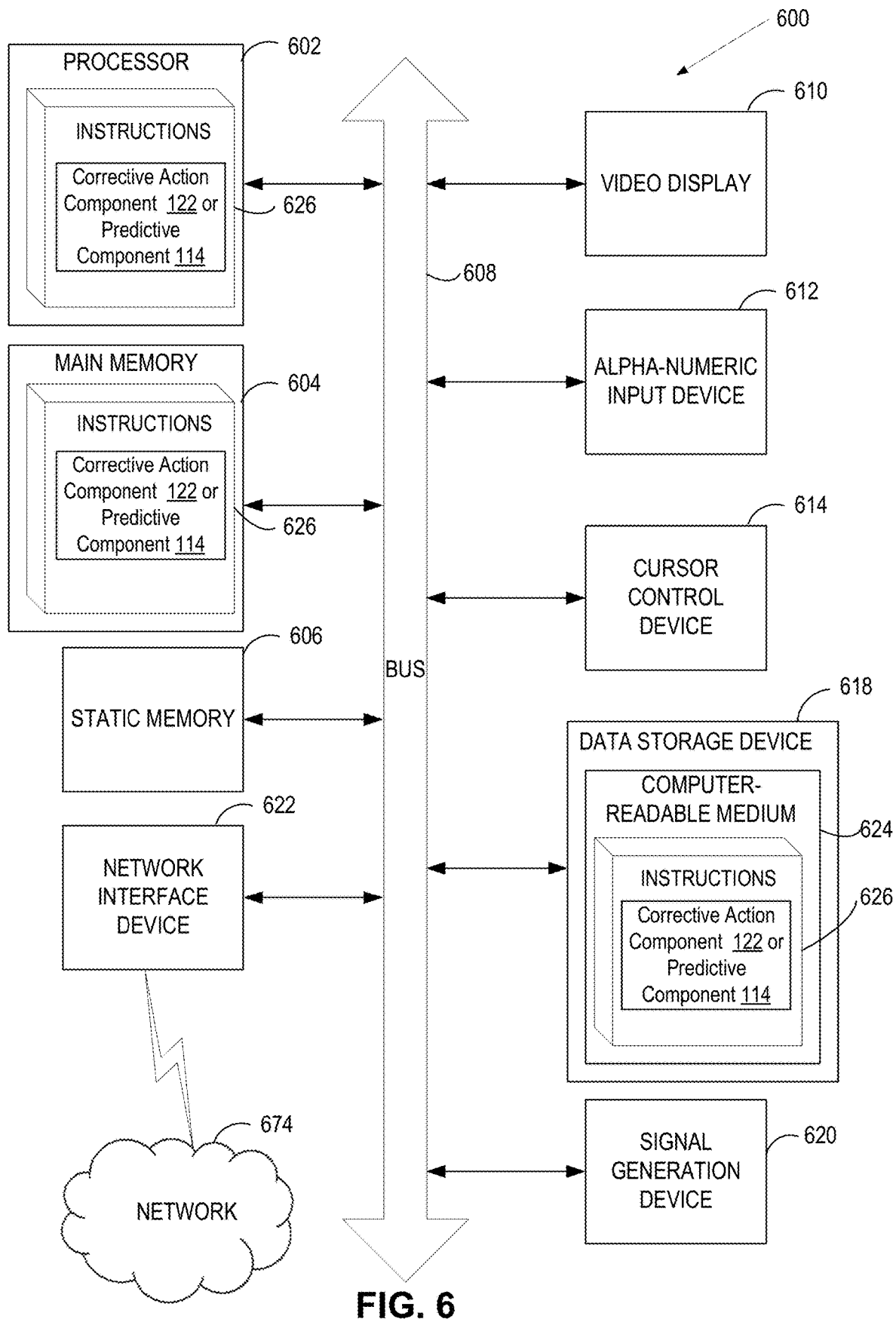
FIG. 6 is a block diagram illustrating a computer system, according to some embodiments.

FIG. 6 is a block diagram illustrating a computer system 600, according to some embodiments. In some embodiments, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a Set-Top Box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein, which may include cloud-based devices.

In a further aspect, the computer system 600 may include a processing device 602, a volatile memory 604 (e.g., Random Access Memory (RAM)), a non-volatile memory 606 (e.g., Read-Only Memory (ROM) or Electrically-Erasable Programmable ROM (EEPROM)), and a data storage device 618, which may communicate with each other via a bus 608.

Processing device 602 may be provided by one or more processors such as a general purpose processor (such as, for example, a Complex Instruction Set Computing (CISC) microprocessor, a Reduced Instruction Set Computing (RISC) microprocessor, a Very Long Instruction Word (VLIW) microprocessor, a microprocessor implementing other types of instruction sets, or a microprocessor implementing a combination of types of instruction sets) or a specialized processor (such as, for example, an Application Specific Integrated Circuit (ASIC), a Field Programmable Gate Array (FPGA), a Digital Signal Processor (DSP), or a network processor).

Computer system 600 may further include a network interface device 622 (e.g., coupled to network 674). Computer system 600 also may include a video display unit 610 (e.g., an LCD), an alphanumeric input device 612 (e.g., a keyboard), a cursor control device 614 (e.g., a mouse), and a signal generation device 620. Video display unit 610 may display aspects of a GUI which enables user interaction with a comprehensive modeling platform.

In some embodiments, data storage device 618 may include a non-transitory computer-readable storage medium 624 (e.g., non-transitory machine-readable medium) on which may store instructions 626 encoding any one or more of the methods or functions described herein, including instructions encoding components of FIG. 1 (e.g., predictive component 114, corrective action component 122, model 190, etc.) and for implementing methods described herein. The non-transitory computer-readable storage medium 624 may stores instructions encoding a comprehensive modeling platform for executing one or more models in association with process chambers.

Instructions 626 may also reside, completely or partially, within volatile memory 604 and/or within processing device 602 during execution thereof by computer system 600, hence, volatile memory 604 and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "receiving," "performing," "providing," "obtaining," "causing," "accessing," "determining," "adding," "using," "training," "reducing," "generating," "correcting," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may include a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods described herein and/or each of their individual functions, routines, subroutines, or operations. Examples of the structure for a variety of these systems are set forth in the description above.

The above description is intended to be illustrative, and not restrictive. Although the present disclosure has been described with references to specific illustrative examples and embodiments, it will be recognized that the present disclosure is not limited to the examples and embodiments described. The scope of the disclosure should be determined with reference to the following claims, along with the full scope of equivalents to which the claims are entitled.

What is claimed is:

1. A method, comprising:

receiving, via a graphical user interface (GUI), by a processing device, a first user selection to view data associated with a first process chamber in a first chamber data mode, wherein data of the first chamber data mode comprises data of a process operation performed in the first process chamber;

providing, for display on the GUI, first display data of the first data chamber mode responsive to receiving the first user selection, the first display data based on output from a digital twin model of the process chamber generated by performing analysis on input sensor data of the process operation, and the first display data being indicative of a quality of performance of the process operation;

receiving a second user selection to view data associated with the first process chamber in a second chamber data mode, wherein data of the second chamber data mode comprises data of a virtual process operation performed by a virtual representation of the first process chamber;

providing, for display on the GUI, second display data of the second data chamber mode responsive to receiving the second user selection, wherein at least one of the first display data, the second display data, or a comparison therebetween, indicates a process abnormality associated with the process operation; and performing a corrective action associated with the first process chamber based on the process abnormality prior to performing a manufacturing process.

2. The method of claim 1, further comprising:

receiving a third user selection to view data associated with a second process chamber in either the first chamber data mode or the second chamber data mode; and providing, for display on the GUI, third display data responsive to receiving the third user selection.

3. The method of claim 1, wherein generating the second display data comprises:

providing, to a trained machine learning model associated with the first process chamber, input data of the virtual process operation; and obtaining output from the trained machine learning model indicative of a quality of performance of the virtual process operation, wherein the second display data comprises the output from the trained machine learning model.

4. A method comprising:

outputting, by a processing device, a view of a manufacturing system comprising a plurality of process chambers, one or more transfer chambers and one or more load locks, wherein the view comprises, for each process chamber of the plurality of process chambers, a graphical representation of the process chamber and one or more view options for data associated with the process chamber;

receiving input of a view option for a selected process chamber from the one or more view options of the plurality of process chambers;

loading one or more virtual models associated with the selected process chamber and the view option, wherein each process chamber is associated with one or more virtual models configured for that process chamber;

providing input data to the one or more virtual models;

obtaining output data from the one or more virtual models comprising a prediction of a cross-sectional profile of a processed substrate, wherein the output data indicates an abnormality; and performing a corrective action based on the abnormality prior to performing a manufacturing process.

5. The method of claim 4, further comprising:

receiving input of a process operation performed in the selected process chamber;

providing sensor data associated with the process operation to the one or more virtual models; and causing data output by the one or more virtual models based on the sensor data to be displayed.

6. The method of claim 4, wherein the prediction of the cross-sectional profile comprises a prediction of a thickness of a layer of the processed substrate at one or more of:
a bottom region of a trench of the processed substrate;
a sidewall of the trench of the processed substrate; or
a field proximate the trench of the processed substrate.

7. The method of claim 4, wherein the prediction of the cross-sectional profile comprises a first prediction of the cross-sectional profile when a first portion of a process operation associated with the processed substrate had been executed, and a second prediction of the cross-sectional profile when the first portion of the process operation and a second portion of the process operation had been executed.

8. The method of claim 4, further comprising:
receiving a first set of simulation inputs;
providing the first set of simulation inputs to the one or more virtual models;
obtaining first output data from the one or more virtual models indicative of a virtual substrate process operation, wherein the first output data is based on the first set of simulation inputs; and
causing the first output data to be displayed.

9. The method of claim 8, wherein the first output data comprises property data of a virtual substrate associated with the virtual substrate process operation.

10. The method of claim 8, wherein the first output data comprises property values of a virtual process chamber associated with the virtual substrate process operation.

11. The method of claim 4, wherein:
a first process chamber of the plurality of process chambers comprises a physical vapor deposition (PVD) chamber, wherein the one or more virtual models associated with the first process chamber are one or more PVD virtual models; and
a second process chamber of the plurality of process chambers comprises an atomic layer deposition (ALD) chamber, wherein the one or more virtual models associated with the first process chamber are one or more ALD virtual models.

12. A method, comprising:
receiving, via a graphical user interface (GUI) of a modeling platform, a first user input of a first process chamber;
providing first input data to a first model of a first modeling data mode responsive to receiving the first user input of the first process chamber, wherein the first input data comprises sensor data from the first process chamber, and wherein operation of the first modeling data mode comprises providing input data from substrate processing operations performed in the first process chamber to a plurality of models comprising the first model;
obtaining first output data from the first model, wherein the first output data comprises predictive data associated with the sensor data from the first process chamber;
providing second input data to a second model responsive to receiving the first user input of the first process chamber, wherein the second input data comprises simulation inputs of a virtual substrate processing operation;
obtaining second output data from the second model, wherein the second output data comprises predictive data of the virtual substrate processing operation;
providing the first output data and the second output data for display on the GUI of the modeling platform, wherein at least one of the first output data, the second output data, or a comparison therebetween, indicates a process abnormality associated with the process operation; and
performing a corrective action associated with the first process chamber based on the process abnormality prior to performing a manufacturing process.

13. The method of claim 12, wherein a first modeling data mode comprises the second model, and wherein the second modeling data mode comprises providing simulation inputs of a virtual substrate processing operation to a plurality of models.

14. The method of claim 12, further comprising:
receiving a second user input of a second process chamber;
providing third input data to a third model responsive to receiving the second user input of the second process chamber, wherein the third input data comprises sensor data from the second process chamber, and wherein the third model is configured to perform the same functions in association with the second process chamber that the first model is configured to perform in association with the first process chamber;
obtaining third output from the third model; and
providing the third output for display on the GUI of the modeling platform.

15. The method of claim 12, further comprising:
responsive to the first user input, providing fourth input data to a calibrated physics-based model associated with the first process chamber;
obtaining third output from the calibrated physics-based model; and
providing the third output for display on the GUI of the modeling platform.

16. The method of claim 12, wherein at least one of the first model or the second model comprises a trained machine learning model.

17. The method of claim 12, wherein at least one of the first model or the second model comprises a calibrated physics-based model.

* * * * *